US012100404B2

(12) United States Patent
Friedrich et al.

(10) Patent No.: US 12,100,404 B2
(45) Date of Patent: Sep. 24, 2024

(54) METHODS FOR PARAMETRIC MULTI-CHANNEL ENCODING

(71) Applicant: DOLBY INTERNATIONAL AB, Dublin (IE)

(72) Inventors: Tobias Friedrich, Furth (DE); Alexander Mueller, Nuremberg (DE); Karsten Linzmeier, Nuremberg (DE); Claus-Christian Spenger, Nuremberg (DE); Tobias R. Wagenblass, Nuremberg (DE)

(73) Assignee: DOLBY INTERNATIONAL AB, Dublin (IE)

( * ) Notice: Subject to any disclaimer, the term of this patent is extended or adjusted under 35 U.S.C. 154(b) by 0 days.

(21) Appl. No.: 18/505,996

(22) Filed: Nov. 9, 2023

(65) Prior Publication Data

US 2024/0144941 A1 May 2, 2024

Related U.S. Application Data

(63) Continuation of application No. 17/975,955, filed on Oct. 28, 2022, now Pat. No. 11,817,108, which is a (Continued)

(51) Int. Cl.
*G10L 19/008* (2013.01)
*G10L 19/16* (2013.01)
*H04S 3/00* (2006.01)

(52) U.S. Cl.
CPC .......... *G10L 19/008* (2013.01); *G10L 19/167* (2013.01); *H04S 3/008* (2013.01); (Continued)

(58) Field of Classification Search
None
See application file for complete search history.

(56) References Cited

U.S. PATENT DOCUMENTS 6,757,396 B1 6/2004 Allred
7,072,477 B1 7/2006 Kincaid
(Continued)

FOREIGN PATENT DOCUMENTS

CN 1492424 A 4/2004
CN 1503260 A 6/2004
(Continued)

OTHER PUBLICATIONS

Hoeg, Wolfgang "Dynamic Range Control (DRC) for Multichannel Audio Systems" presented at the 102nd Convention, Mar. 22-25, 1997, Munich, Germany, pp. 1-13.
(Continued)

*Primary Examiner* — Kenny H Truong

(57) ABSTRACT

The present document relates to audio coding systems. In particular, the present document relates to efficient methods and systems for parametric multi-channel audio coding. An audio encoding system configured to generate a bitstream indicative of a downmix signal and spatial metadata for generating a multi-channel upmix signal from the downmix signal is described. The system comprises a downmix processing unit configured to generate the downmix signal from a multi-channel input signal; wherein the downmix signal comprises m channels and wherein the multi-channel input signal comprises n channels; n, m being integers with m<n. Furthermore, the system comprises a parameter processing unit configured to determine the spatial metadata from the multi-channel input signal. In addition, the system comprises a configuration unit configured to determine one or more control settings for the parameter processing unit based on one or more external settings; wherein the one or more external settings comprise a target data-rate for the bitstream and wherein the one or more control settings comprise a maximum data-rate for the spatial metadata.

3 Claims, 13 Drawing Sheets

Related U.S. Application Data continuation of application No. 17/177,217, filed on Feb. 17, 2021, now Pat. No. 11,488,611, which is a continuation of application No. 16/864,694, filed on May 1, 2020, now Pat. No. 10,930,291, which is a continuation of application No. 16/436,835, filed on Jun. 10, 2019, now Pat. No. 10,643,626, which is a continuation of application No. 15/646,482, filed on Jul. 11, 2017, now Pat. No. 10,360,919, which is a continuation of application No. 14/767,883, filed as application No. PCT/EP2014/053475 on Feb. 21, 2014, now Pat. No. 9,715,880.

(60) Provisional application No. 61/767,673, filed on Feb. 21, 2013.

(52) U.S. Cl.
CPC ....... *H04S 2400/01* (2013.01); *H04S 2400/03* (2013.01); *H04S 2420/03* (2013.01)

(56) References Cited

U.S. PATENT DOCUMENTS

| | | | |
|---|---|---|---|
| 7,369,906 | B2 | 5/2008 | Frindle |
| 7,729,673 | B2 | 6/2010 | Romesburg |
| 7,979,282 | B2 | 7/2011 | Kim |
| 8,239,210 | B2 | 8/2012 | Fejzo |
| 8,315,396 | B2 | 11/2012 | Schreiner |
| 8,781,820 | B2 | 7/2014 | Seguin |
| 8,903,098 | B2 | 12/2014 | Tsuji |
| 8,903,729 | B2 | 12/2014 | Riedmiller |
| 8,965,774 | B2 | 2/2015 | Eppolito |
| 8,989,884 | B2 | 3/2015 | Guetta |
| 9,240,763 | B2 | 1/2016 | Baumgarte |
| 9,294,062 | B2 | 3/2016 | Hatanaka |
| 9,300,268 | B2 | 3/2016 | Chen |
| 9,542,952 | B2 | 1/2017 | Hatanaka |
| 9,576,585 | B2 | 2/2017 | Bleidt |
| 9,608,588 | B2 | 3/2017 | Baumgarte |
| 9,633,663 | B2 | 4/2017 | Heuberger |
| 9,830,915 | B2 | 11/2017 | Schreiner |
| 9,836,272 | B2 | 12/2017 | Kono |
| 2006/0235683 | A1 | 10/2006 | Sperschneider |
| 2007/0094014 | A1 | 4/2007 | Pang |
| 2007/0219808 | A1 | 9/2007 | Herre |
| 2008/0025530 | A1 | 1/2008 | Romesburg |
| 2008/0199014 | A1 | 8/2008 | Kurniawati |
| 2008/0269929 | A1 | 10/2008 | Oh |
| 2009/0164222 | A1 | 6/2009 | Kim |
| 2009/0164224 | A1 | 6/2009 | Fejzo |
| 2010/0135507 | A1 | 6/2010 | Kino |
| 2011/0002393 | A1 | 1/2011 | Suzuki |
| 2011/0208528 | A1 | 8/2011 | Schildbach |
| 2012/0128179 | A1 | 5/2012 | Kano |
| 2012/0275625 | A1 | 11/2012 | Kono |
| 2013/0094669 | A1 | 4/2013 | Kono |
| 2014/0023197 | A1 | 1/2014 | Xiang |
| 2016/0001989 | A1 | 1/2016 | Oren |
| 2016/0019898 | A1 | 1/2016 | Schreiner |
| 2016/0225376 | A1 | 8/2016 | Honma |
| 2016/0315722 | A1 | 10/2016 | Holman |
| 2016/0351202 | A1 | 12/2016 | Baumgarte |
| 2017/0092280 | A1 | 3/2017 | Hirabayashi |
| 2017/0223429 | A1 | 8/2017 | Schreiner |

FOREIGN PATENT DOCUMENTS

| | | | |
|---|---|---|---|
| CN | 101297353 | | 10/2008 |
| CN | 101326726 | | 12/2008 |
| CN | 102138177 | | 7/2011 |
| CN | 102884570 | B | 1/2013 |
| EP | 3089161 | | 11/2016 |
| JP | 2005-292640 | | 10/2005 |
| JP | 2008-505586 | | 2/2008 |
| JP | 2009-500658 | | 1/2009 |
| JP | 2009-501948 | | 1/2009 |
| JP | 2010-537468 | | 12/2010 |
| JP | 2011035459 | A | 2/2011 |
| JP | 2012-507059 | | 3/2012 |
| JP | 2012-521012 | | 9/2012 |
| KR | 20070003545 | | 1/2007 |
| WO | 2006/058590 | | 6/2006 |
| WO | 2006/108465 | | 10/2006 |
| WO | 2006/111294 | | 10/2006 |
| WO | 2008/022566 | | 2/2008 |
| WO | 2009/045636 | | 4/2009 |
| WO | 2010/040503 | | 4/2010 |
| WO | 2011/030354 | | 3/2011 |
| WO | 2011/131732 | | 10/2011 |
| WO | 2012/110448 | | 8/2012 |
| WO | 2012/126891 | | 9/2012 |
| WO | 2014/111290 | | 7/2014 |
| WO | 2014/160849 | | 10/2014 |
| WO | 2014/160895 | | 10/2014 |
| WO | 2015/059087 | | 4/2015 |
| WO | 2015/088697 | | 6/2015 |
| WO | 2015/144587 | | 10/2015 |
| WO | 2015/148046 | | 10/2015 |
| WO | 2016/075053 | | 5/2016 |
| WO | 2016/193033 | | 12/2016 |
| WO | 2016/202682 | | 12/2016 |
| WO | 2017/023423 | | 2/2017 |
| WO | 2017/023601 | | 2/2017 |
| WO | 2017/058731 | | 4/2017 |
| WO | 2016/002738 | | 5/2017 |

OTHER PUBLICATIONS

Kudumakis—107th MPEG San Jose (CA), USA, Jan. 13-17, 2014, Meeting Report Panos Kudumakis qMedia, Queen Mary University of London (7 pgs.).
Kudumakis—108th MPEG Valencia, Spain, Mar. 31-Apr. 4, 2014, Meeting Report Panos Kudumakis qMedia, Queen Mary University of London (9 pgs.).
Mailhot, J. et al "Issues and Pitfalls Regarding the Treatment of Pre-Compressed Audio Signals in Video Processing and Encoding Equipment" International Broadcasting Conference, Sep. 9, 2010.
Neuendorf, M. et al "MPEG Unified Speech and Audio Coding—The ISO/MPEG Standard for High-Efficiency Audio Coding of all Content Types", AES Convention 132, Apr. 26, 2012.
Pang, Hee-Suk "Clipping Prevention Scheme for MPEG Surround" ETRI Journal Electronics and Telecommunications Research Institute, vol. 30, No. 4, Aug. 2008, pp. 606-608.
Robinson, C. et al "Dynamic Range Control via Metadata" AES presented at the 107th Convention, Sep. 24-27, 1999, pp. 1-14.
Roden, J. et al "A Study of the MPEG Surround Quality versus Bit-Rate Curve" AES presented at the 123rd Convention, Oct. 5-8, 2007, New York, USA, pp. 1-15.
Valero, Maria Luis, et al A New Parametric Stereo and Multi Channel Extension for MPEG-4 Enhanced Low Delay AAC (AAC-ELD), AES presented at the 128th Convention, May 22-25, 2010, London, UK, pp. 1-11.

METHODS FOR PARAMETRIC MULTI-CHANNEL ENCODING

CROSS-REFERENCE TO RELATED APPLICATIONS

This application is a continuation of U.S. patent application Ser. No. 17/975,955, filed Oct. 28, 2022, which is a continuation of U.S. patent application Ser. No. 17/177,217, filed Feb. 17, 2021 (now U.S. Pat. No. 11,488,611), which is a continuation of U.S. patent application Ser. No. 16/864,694, filed May 1, 2020 (now U.S. Pat. No. 10,930,291), which is a continuation of U.S. patent application Ser. No. 16/436,835, filed Jun. 10, 2019 (now U.S. Pat. No. 10,643,626), which is a continuation of U.S. patent application Ser. No. 15/646,482, filed Jul. 11, 2017 (now U.S. Pat. No. 10,360,919), which is a continuation of U.S. patent application Ser. No. 14/767,883, filed Aug. 13, 2015 (now U.S. Pat. No. 9,715,880), which is the 371 national phase of PCT Application No. PCT/EP2014/053475, filed Feb. 21, 2014, which claims priority to U.S. Provisional Patent Application No. 61/767,673, filed Feb. 21, 2013, each of which is hereby incorporated by reference in its entirety.

TECHNICAL FIELD

The present document relates to audio coding systems. In particular, the present document relates to efficient methods and systems for parametric multi-channel audio coding.

BACKGROUND

Parametric multi-channel audio coding system may be used to provide increased listening quality at particularly low data-rates. Nevertheless, there is a need to further improve such parametric multi-channel audio coding systems, notably with respect to bandwidth efficiency, computational efficiency and/or robustness.

SUMMARY

According to an aspect an audio encoding system is described which is configured to generate a bitstream indicative of a downmix signal and spatial metadata. The spatial metadata may be used by a corresponding decoding system to generate a multi-channel upmix signal from the downmix signal. The downmix signal may comprise m channels and the multi-channel upmix signal may comprise n channels with n, m being integers and with $m<n$. In an example, $n=6$ and $m=2$. The spatial metadata may allow the corresponding decoding system to generate the n channels of the multi-channel upmix signal from the m channels of the downmix signal.

The audio encoding system may be configured to quantize and/or to encode the downmix signal and the spatial metadata and to insert the quantized/encoded data into the bitstream. In particular, the downmix signal may be encoded using a Dolby Digital Plus encoder, and the bitstream may correspond to a Dolby Digital Plus bitstream. The quantized/encoded spatial metadata may be inserted into a data field of the Dolby Digital Plus bitstream.

The audio encoding system may comprise a downmix processing unit configured to generate the downmix signal from a multi-channel input signal. The downmix processing unit is also referred to herein as the downmix coding unit. The multi-channel input signal may comprise n channels, like the multi-channel upmix signal which is re-generated based on the downmix signal. In particular, the multi-channel upmix signal may provide an approximation of the multi-channel input signal. The downmix unit may comprise the above mentioned Dolby Digital Plus encoder. The multi-channel upmix signal and the multi-channel input signal may be 5.1 or 7.1 signals and the downmix signal may be a stereo signal.

The audio encoding system may comprise a parameter processing unit configured to determine the spatial metadata from the multi-channel input signal. In particular, the parameter processing unit (which is also referred to as the parameter encoding unit in the present document) may be configured to determined one or more spatial parameters, e.g. a set of spatial parameters, which may be determined based on different combinations of the channels of the multi-channel input signal. A spatial parameter of the set of spatial parameters may be indicative of a cross-correlation between different channels of the multi-channel input signal. The parameter processing unit may be configured to determine spatial metadata for a frame of the multi-channel input signal, referred to as a spatial metadata frame. A frame of the multi-channel input signal typically comprises a pre-determined number (e.g. 1536) of samples of the multi-channel input signal. Each spatial metadata frame may comprise one or more sets of spatial parameters.

The audio encoding system may further comprise a configuration unit configured to determine one or more control settings for the parameter processing unit based on one or more external settings. The one or more external settings may comprise a target data-rate for the bitstream. Alternatively or in addition, the one or more external settings may comprise one or more of: a sampling rate of the multi-channel input signal, the number m of channels of the downmix signal, the number n of channels of the multi-channel input signal, and/or an update period indicative of a time period required by a corresponding decoding system to synchronize to the bitstream. The one or more control settings may comprise a maximum data-rate for the spatial metadata. In case of spatial metadata frames, the maximum data-rate for the spatial metadata may be indicative of a maximum number of metadata bits for a spatial metadata frame. Alternatively or in addition, the one or more control settings may comprise one or more of: a temporal resolution setting indicative of a number of sets of spatial parameters per spatial metadata frame to be determined, a frequency resolution setting indicative of a number of frequency bands for which spatial parameters are to be determined, a quantizer setting indicative of a type of quantizer to be used for quantizing the spatial metadata, and an indication whether a current frame of the multi-channel input signal is to be encoded as an independent frame.

The parameter processing unit may be configured to determine whether the number of bits of a spatial metadata frame which has been determined in accordance to the one or more control settings exceeds the maximum number of metadata bits. Furthermore, the parameter processing unit may be configured to reduce the number of bits of a particular spatial metadata frame, if it is determined that the number of bits of the particular spatial metadata frame exceeds the maximum number of metadata bits. This reduction of the number of bits may be performed in a resource (processing power) efficient manner. In particular, this reduction of the number of bits may be performed without the need of re-calculating the complete spatial metadata frame.

As indicated above, a spatial metadata frame may comprise one or more sets of spatial parameters. The one or more control settings may comprise a temporal resolution setting indicative of a number of sets of spatial parameters per spatial metadata frame to be determined by the parameter processing unit. The parameter processing unit may be configured to determine as many sets of spatial parameters for a current spatial metadata frame, as indicated by the temporal resolution setting. Typically the temporal resolution setting takes on the values of 1 or 2. Furthermore, the parameter processing unit may be configured to discard a set of spatial parameters from the current spatial metadata frame, if the current spatial metadata frame comprises a plurality of sets of spatial parameters and if it is determined that the number of bits of the current spatial metadata frame exceeds the maximum number of metadata bits. The parameter processing unit may be configured to retain at least one set of spatial parameters per spatial metadata frame. By discarding a set of spatial parameters from the spatial metadata frame, the number of bits of the spatial metadata frame may be reduced with little computational effort and without significantly impacting the perceived listening quality of the multi-channel upmix signal.

The one or more sets of spatial parameters are typically associated with corresponding one or more sampling points. The one or more sampling points may be indicative of corresponding one or more time instants. In particular, a sampling point may be indicative of the time instant at which a decoding system should fully apply the corresponding set of spatial parameters. In other words, a sampling point may be indicative of the time instant for which the corresponding set of spatial parameters has been determined.

The parameter processing unit may be configured to discard a first set of spatial parameters from the current spatial metadata frame, wherein the first set of spatial parameters is associated with a first sampling point prior to a second sampling point, if the plurality of sampling points of the current metadata frame is not associated with transients of the multi-channel input signal. On the other hand, the parameter processing unit may be configured to discard the second (which is typically the last) set of spatial parameters from the current spatial metadata frame, if the plurality of sampling points of the current metadata frame is associated with transients of the multi-channel input signal. By doing this, the parameter processing unit may be configured to reduce the effect of discarding a set of spatial parameters on the listening quality of the multi-channel upmix signal.

The one or more control settings may comprise a quantizer setting indicative of a first type of quantizer from a plurality of pre-determined types of quantizers. The plurality of pre-determined types of quantizers may provide different quantizer resolutions, respectively. In particular, the plurality of pre-determined types of quantizers may comprise a fine quantization and a coarse quantization. The parameter processing unit may be configured to quantize the one or more sets of spatial parameters of a current spatial metadata frame in accordance to the first type of quantizer. Furthermore, the parameter processing unit may be configured to re-quantize one, some or all of the spatial parameters of the one or more sets of spatial parameters in accordance to a second type of quantizer having a lower resolution than the first type of quantizer, if it is determined that the number of bits of the current spatial metadata frame exceeds the maximum number of metadata bits. By doing this, the number of bits of the current spatial metadata frame can be reduced, while affecting the quality of the upmix signal only to a limited extent, and while not significantly increasing the computational complexity of the audio encoding system.

The parameter processing unit may be configured to determine a set of temporal difference parameters based on the difference of a current set of spatial parameters with respect to a directly preceding set of spatial parameters. In particular, a temporal difference parameter may be determined by determining the difference of a parameter of the current set of spatial parameters and a corresponding parameter of the directly preceding set of spatial parameters. The set of spatial parameters may comprise e.g. the parameters $\alpha_1$, $\alpha_2$, $\alpha_3$, $\beta_1$, $\beta_2$, $\beta_3$, g, $k_1$, $k_2$ described in the present document. Typically, only one of the parameters $k_1$,$k_2$ may need to be transmitted, as the parameters may be related by the relation $k_1^2+k_2^2=1$. By way of example only the parameter $k_1$ may be transmitted and the parameter $k_2$ may be calculated at the receiver. The temporal difference parameters may relate to the difference of corresponding ones of the above mentioned parameters.

The parameter processing unit may be configured to encode the set of temporal difference parameters using entropy encoding, e.g. using Huffman codes. Furthermore, the parameter processing unit may be configured to insert the encoded set of temporal difference parameters into the current spatial metadata frame. In addition, the parameter processing unit may be configured to reduce an entropy of the set of temporal difference parameters, if it is determined that the number of bits of the current spatial metadata frame exceeds the maximum number of metadata bits. As a result of this, the number of bits required for entropy encoding the temporal difference parameters may be reduced, thereby reducing the number of bits used for the current spatial metadata frame. By way of example, the parameter processing unit may be configured to set one, some or all of the temporal difference parameters of the set of temporal difference parameters equal to a value having an increased (e.g. the highest) probability of possible values of the temporal difference parameters, in order to reduce the entropy of the set of temporal difference parameters. In particular, the probability may be increased compared to the probability of the temporal difference parameter prior to the setting operation. Typically, the value having the highest probability of possible values of the temporal difference parameters corresponds to zero.

It should be noted that temporal differential encoding of the set of spatial parameters typically may not be used for independent frames. As such, the parameter processing unit may be configured to verify whether the current spatial metadata frame is an independent frame, and only apply temporal differential encoding, if the current spatial metadata frame is not an independent frame. On the other hand, the frequency differential encoding described below may also be used for independent frames.

The one or more control settings may comprise a frequency resolution setting, wherein the frequency resolution setting is indicative of a number of different frequency bands for which respective spatial parameters, referred to as band parameters, are to be determined. The parameter processing unit may be configured to determine different corresponding spatial parameters (band parameters) for the different frequency bands. In particular, different parameters $\alpha_1$, $\alpha_2$, $\alpha_3$, $\beta_1$, $\beta_2$, $\beta_3$, g, $k_1$, $k_2$ for the different frequency bands may be determined. The set of spatial parameters may therefore comprise corresponding band parameters for the different frequency bands. By way of example, the set of spatial parameters may comprise T corresponding band parameters for T frequency bands, T being an integer, e.g. T=7, 9, 12 or 15.

The parameter processing unit may be configured to determine a set of frequency difference parameters based on the difference of one or more band parameters in a first frequency band with respect to corresponding one or more band parameters in a second, adjacent, frequency band. Furthermore, the parameter processing unit may be configured to encode the set of frequency difference parameters using entropy encoding, e.g. based on Huffman codes. In addition, the parameter processing unit may be configured to insert the encoded set of frequency difference parameters into the current spatial metadata frame. Furthermore, the parameter processing unit may be configured to reduce an entropy of the set of frequency difference parameters, if it is determined that the number of bits of the current spatial metadata frame exceeds the maximum number of metadata bits. In particular, the parameter processing unit may be configured to set one, some or all of the frequency difference parameters of the set of frequency difference parameters equal to a value (e.g. zero) having an increased probability of possible values of the frequency difference parameters, in order to reduce the entropy of the set of frequency difference parameters. In particular, the probability may be increased compared to the probability of the frequency difference parameter prior to the setting operation.

Alternatively or in addition, the parameter processing unit may be configured to reduce the number of frequency bands, if it is determined that the number of bits of the current spatial metadata frame exceeds the maximum number of metadata bits. In addition, the parameter processing unit may be configured to re-determine some or all of the one or more sets of spatial parameters for the current spatial metadata frame using the reduced number of frequency bands. Typically, a change in the number of frequency bands affects mainly the high frequency bands. As a result, the band parameters of one of more frequencies may not be affected, such that the parameter processing unit may not need to recalculate all the band parameters.

As indicated above, the one or more external settings may comprise an update period indicative of a time period required by a corresponding decoding system to synchronize to the bitstream. Furthermore, the one or more control settings may comprise an indication whether a current spatial metadata frame is to be encoded as an independent frame. The parameter processing unit may be configured to determine a sequence of spatial metadata frames for a corresponding sequence of frames of the multi-channel input signal. The configuration unit may be configured to determine the one or more spatial metadata frames from the sequence of spatial metadata frames, which are to be encoded as independent frames, based on the update period.

In particular, the one or more independent spatial metadata frames may be determined such that the update period is met (in average). For this purpose, the configuration unit may be configured to determine whether a current frame of the sequence of frames of the multi-channel input signal comprises a sample at a time instant (relative of the beginning of the multi-channel input signal) which is an integer multiple of the update period. Furthermore, the configuration unit may be configured to determine that the current spatial metadata frame corresponding to the current frame is an independent frame (as it comprises a sample at a time instant which is an integer multiple of the update period). The parameter processing unit may be configured to encode one or more sets of spatial parameters of a current spatial metadata frame independently from data comprised in a previous (and/or future) spatial metadata frame, if the current spatial metadata frame is to be encoded as an independent frame. Typically, all the sets of spatial parameters of the current spatial metadata are encoded independently from data comprised in a previous (and/or future) spatial metadata frame, if the current spatial metadata frame is to be encoded as an independent frame.

According to another aspect, a parameter processing unit is described, which is configured to determine a spatial metadata frame for generating a frame of a multi-channel upmix signal from a corresponding frame of a downmix signal. The downmix signal may comprise m channels and the multi-channel upmix signal may comprise n channels; n, m being integers with $m<n$. As outlined above, the spatial metadata frame may comprise one or more sets of spatial parameters.

The parameter processing unit may comprise a transform unit configured to determine a plurality of spectra from a current frame and a directly following frame (referred to as a look-ahead frame) of a channel of the multi-channel input signal. The transform unit may make use of a filterbank, e.g. a QMF filterbank. A spectrum of the plurality of spectra may comprise a pre-determined number of transform coefficients in a corresponding pre-determined number of frequency bins. The plurality of spectra may be associated with a corresponding plurality of time bins (or time instants). As such, the transform unit may be configured to provide a time/frequency representation of the current frame and of the look-ahead frame. By way of example, the current frame and the look-ahead frame may comprise K samples each. The transform unit may be configured to determine 2 times K/Q spectra comprising Q transform coefficients each.

The parameter processing unit may comprise a parameter determination unit configured to determine the spatial metadata frame for the current frame of the channel of the multi-channel input signal by weighting the plurality of spectra using a window function. The window function may be used to adjust the impact of a spectrum of the plurality of spectra on a particular spatial parameter or on a particular set of spatial parameters. By way of example, the window function may take on values between 0 and 1.

The window function may depend on one or more of: a number of sets of spatial parameters comprised within the spatial metadata frame, a presence of one or more transients in the current frame or in the directly following frame of the multi-channel input signal, and/or a time instant of the transient. In other words, the window function may be adapted in accordance to properties of the current frame and/or of the look-ahead frame. In particular, the window function used for determining a set of spatial parameters (referred to as a set-dependent window function) may depend on the properties of the current frame and/or of the look-ahead frame.

As such, the window function may comprise a set-dependent window function. In particular, the window function for determining the spatial parameters of a spatial metadata frame may comprise (or may be made up from) one or more set-dependent window functions for the one or more sets of spatial parameters, respectively. The parameter determination unit may be configured to determine a set of spatial parameters for the current frame of the channel of the multi-channel input signal (i.e. for the current spatial metadata frame) by weighting the plurality of spectra using the set-dependent window function. As outlined above, the set-dependent window function may depend on one or more properties of the current frame. In particular, the set-dependent window function may depend on whether the set of spatial parameters is associated with a transient or not.

By way of example, if the set of spatial parameters is not associated with a transient, the set-dependent window function may be configured to provide a phase-in of the plurality of spectra starting from a sampling point of a preceding set of spatial parameters up to a sampling point of the set of spatial parameters. The phase-in may be provided by a window function transiting from 0 to 1. Alternatively or in addition, if the set of spatial parameters is not associated with a transient, the set-dependent window function may include (or may consider fully or may leave unaffected) the plurality of spectra starting from the sampling point of the set of spatial parameters up to a spectrum of the plurality of spectra preceding a sampling point of a following set of spatial parameters, if the following set of spatial parameters is associated with a transient.

This may be achieved by a window function having a value of 1. Alternatively or in addition, if the set of spatial parameters is not associated with a transient, the set-dependent window function may cancel out (or may exclude or may attenuate) the plurality of spectra starting from the sampling point of the following set of spatial parameters, if the following set of spatial parameters is associated with a transient. This may be achieved by a window function having a value of 0. Alternatively or in addition, if the set of spatial parameters is not associated with a transient, the set-dependent window function may phase-out the plurality of spectra starting from the sampling point of the set of spatial parameters up to a spectrum of the plurality of spectra preceding a sampling point of a following set of spatial parameters, if the following set of spatial parameters is not associated with a transient. The phase-in may be provided by a window function transiting from 1 to 0.

On the other hand, if the set of spatial parameters is associated with a transient, the set-dependent window function may cancel out (or may exclude or may attenuate) the spectra from the plurality of spectra preceding a sampling point of the set of spatial parameters. Alternatively or in addition, if the set of spatial parameters is associated with a transient, the set-dependent window function may include (or may leave unaffected) the spectra from the plurality of spectra starting from the sampling point of the set of spatial parameters up to the spectrum of the plurality of spectra preceding a sampling point of the following set of spatial parameters and may cancel out (or may exclude or may attenuate) the spectra from the plurality of spectra starting from the sampling point of the following set of spatial parameters, if the sampling point of the following set of spatial parameters is associated with a transient. Alternatively or in addition, if the set of spatial parameters is associated with a transient, the set-dependent window function may include (or may leave unaffected) the spectra of the plurality of spectra from the sampling point of the set of spatial parameters up to the spectrum of the plurality of spectra at an end of the current frame and may provide for a phase-out of (or may progressively attenuate) the spectra of the plurality of spectra from a beginning of the directly following frame up to the sampling point of the following set of spatial parameters, if the following set of spatial parameters is not associated with a transient.

According to a further aspect, a parameter processing unit is described, which is configured to determine a spatial metadata frame for generating a frame of a multi-channel upmix signal from a corresponding frame of a downmix signal. The downmix signal may comprise m channels and the multi-channel upmix signal may comprise n channels; n, m being integers with $m<n$. As discussed above, the spatial metadata frame may comprise a set of spatial parameters.

As outlined above, the parameter processing unit may comprise a transform unit. The transform unit may be configured to determine a first plurality of transform coefficients from a frame of a first channel of a multi-channel input signal. Furthermore, the transform unit may be configured to determine a second plurality of transform coefficients from the corresponding frame of a second channel of the multi-channel input signal. The first and second channels may be different. As such, the first and second plurality of transform coefficients provide a first and a second time/frequency representation of the corresponding frames of the first and second channels, respectively. As outlined above, the first and second time/frequency representations comprise a plurality of frequency bins and a plurality of time bins.

Furthermore, the parameter processing unit may comprise a parameter determination unit configured to determine the set of spatial parameters based on the first and second plurality of transform coefficients using fixed point arithmetic. As indicated above, the set of spatial parameters typically comprises corresponding band parameters for different frequency bands, wherein the different frequency bands may comprise different numbers of frequency bins. A particular band parameter for a particular frequency band may be determined based on the transform coefficients from the first and second plurality of transform coefficients of the particular frequency band (typically without considering the transform coefficients of the other frequency bands). The parameter determination unit may be configured to determine a shift which is used by the fixed point arithmetic for determining the particular band parameter in dependence on the particular frequency band. Notably, the shift used by the fixed point arithmetic for determining the particular band parameter for the particular frequency band may depend on the number of frequency bins comprised within the particular frequency band. Alternatively or in addition, the shift used by the fixed point arithmetic for determining the particular band parameter for the particular frequency band may depend on the number of time bins to be considered for determining the particular band parameter.

The parameter determination unit may be configured to determine a shift for the particular frequency band such that a precision of the particular band parameter is maximized. This may be achieved by determining the shift needed for each multiply and add operation of the determination process of the particular band parameter.

The parameter determination unit may be configured to determine the particular band parameter for the particular frequency band p, by determining a first energy (or energy estimate) $E_{1,1}(p)$ based on the transform coefficients from the first plurality of transform coefficients falling into the particular frequency band p. Furthermore, a second energy (or energy estimate) $E_{2,2}(p)$ may be determined based on the transform coefficients from the second plurality of transform coefficients falling into the particular frequency band p. In addition, a cross-product or covariance $E_{1,2}(p)$ may be determined based on the transform coefficients from the first and second plurality of transform coefficients falling into the particular frequency band p. The parameter determination unit may be configured to determine the shift $z_p$ for the particular band parameter p based on a maximum of the first energy estimate $E_{1,1}(p)$, the second energy estimate $E_{2,2}(p)$ and the absolute value of the covariance $E_{1,2}(p)$.

According to another aspect, an audio encoding system is described, which is configured to generate a bitstream indicative of a sequence of frames of a downmix signal and a corresponding sequence of spatial metadata frames for generating a corresponding sequence of frames of a multichannel upmix signal from the sequence of frames of the downmix signal. The system may comprise a downmix processing unit configured to generate the sequence of frames of the downmix signal from a corresponding sequence of frames of a multi-channel input signal. As indicated above, the downmix signal may comprise m channels and the multi-channel input signal may comprise n channels; n, m being integers with m<n. Furthermore, the audio encoding system may comprise a parameter processing unit configured to determine the sequence of spatial metadata frames from the sequence of frames of the multi-channel input signal.

In addition, the audio encoding system may comprise a bitstream generation unit configured to generate the bitstream comprising a sequence of bitstream frames, wherein a bitstream frame is indicative of a frame of the downmix signal corresponding to a first frame of the multi-channel input signal and a spatial metadata frame corresponding to a second frame of the multi-channel input signal. The second frame may be different from the first frame. In particular, the first frame may precede the second frame. By doing this, the spatial metadata frame for a current frame may be transmitted along with the frame of a subsequent frame. This ensures that the spatial metadata frame only arrives at the corresponding decoding system when it is needed. The decoding system typically decodes the current frame of the downmix signal and generates a decorrelated frame based on the current frame of the downmix signal. This processing introduces algorithmic delay, and by delaying the spatial metadata frame for the current frame, it is ensured that the spatial metadata frame only arrives at the decoding system, once the decoded current frame and the decorrelated frame are provided. As a result, the processing power and memory requirements of the decoding system can be reduced.

In other words, an audio encoding system configured to generate a bitstream based on a multi-channel input signal is described. As outlined above, the system may comprise a downmix processing unit configured to generate a sequence of frames of a downmix signal from a corresponding sequence of first frames of the multi-channel input signal. The downmix signal may comprise m channels and the multi-channel input signal may comprise n channels; n, m being integers with m<n. Furthermore, the audio encoding system may comprise a parameter processing unit configured to determine a sequence of spatial metadata frames from a sequence of second frames of the multi-channel input signal. The sequence of frames of the downmix signal and the sequence of spatial metadata frames may be used by a corresponding decoding system for generating a multi-channel upmix signal comprising n channels.

The audio encoding system may further comprise a bitstream generation unit configured to generate the bitstream comprising a sequence of bitstream frames, wherein a bitstream frame may be indicative of a frame of the downmix signal corresponding to a first frame of the sequence of first frames of the multi-channel input signal and a spatial metadata frame corresponding to a second frame of the sequence of second frames of the multi-channel input signal. The second frame may be different from the first frame. In other words, the framing used for determining the spatial metadata frames and the framing used for determining the frames of the downmix signal may be different. As outlined above, the different framing may be used to ensure that the data is aligned at the corresponding decoding system.

The first frame and the second frame typically comprise the same number of samples (e.g. 1536 samples). Some of the samples of the first frame may precede the samples of the second frame. In particular, the first frame may precede the second frame by a pre-determined number of samples. The predetermined number of samples may e.g. correspond to a fraction of the number of samples of a frame. By way of example, the pre-determined number of samples may correspond to 50% or more of the number of samples of a frame. In a particular example, the pre-determined number of samples corresponds to 928 samples. As is shown in the present document, this particular number of samples provides a minimum overall delay and an optimum alignment for a particular implementation of the audio encoding and decoding system.

According to a further aspect, an audio encoding system configured to generate a bitstream based on a multi-channel input signal is described. The system may comprise a downmix processing unit configured to determine a sequence of clipping protection gains (also referred to as clip-gains and/or DRC2 parameters in the present document) for a corresponding sequence of frames of the multi-channel input signal. A current clipping protection gain may be indicative of an attenuation to be applied to a current frame of the multi-channel input signal to prevent a corresponding current frame of a downmix signal from clipping. In a similar manner, the sequence of clipping protection gains may be indicative of the respective attenuation to be applied to the frames of the sequence of frames of the multi-channel input signal to prevent the corresponding frames of a sequence of frames of the downmix signal from clipping.

The downmix processing unit may be configured to interpolate the current clipping protection gain and a preceding clipping protection gain of a preceding frame of the multi-channel input signal to yield a clipping protection gain curve. This may be performed in a similar manner for the sequence of clipping protection gains. Furthermore, the downmix processing unit may be configured to apply the clipping protection gain curve to the current frame of the multi-channel input signal to yield an attenuated current frame of the multi-channel input signal. Again this may be performed in a similar manner for the sequence of frames of the multi-channel input signal. Furthermore, the downmix processing unit may be configured to generate a current frame of a sequence of frames of the downmix signal from the attenuated current frame of the multi-channel input signal. In a similar manner, the sequence of frames of the downmix signal may be generated.

The audio processing system may further comprise a parameter processing unit configured to determine a sequence of spatial metadata frames from the multi-channel input signal. The sequence of frames of the downmix signal and the sequence of spatial metadata frames may be used to generate a multi-channel upmix signal comprising n channels, such that the multi-channel upmix signal is an approximation of the multi-channel input signal. In addition, the audio processing system may comprise a bitstream generation unit configured to generate the bitstream indicative of the sequence of clipping protection gains, the sequence of frames of the downmix signal and the sequence of spatial metadata frames, to enable a corresponding decoding system to generate the multi-channel upmix signal.

The clipping protection gain curve may comprise a transition segment, providing a smooth transition from the preceding clipping protection gain to the current clipping protection gain and a flat segment, remaining flat at the current clipping protection gain. The transition segment may extend across a pre-determined number of samples of the current frame of the multi-channel input signal. The pre-determined number of samples may be greater than one and smaller than a total number of samples of the current frame of the multi-channel input signal. In particular, the predetermined number of samples may correspond to a block of samples (wherein a frame may comprise a plurality of blocks) or to a frame. In a particular example, a frame may comprise 1536 samples and a block may comprise 256 samples.

According to a further aspect, an audio encoding system is described, which is configured to generate a bitstream indicative of a downmix signal and spatial metadata for generating a multi-channel upmix signal from the downmix signal. The system may comprise a downmix processing unit configured to generate the downmix signal from a multi-channel input signal.

Furthermore, the system may comprise a parameter processing unit configured to determine a sequence of frames of spatial metadata for a corresponding sequence of frames of the multi-channel input signal.

Furthermore, the audio encoding system may comprise a configuration unit configured to determine one or more control settings for the parameter processing unit based on one or more external settings. The one or more external settings may comprise an update period indicative of a time period required by a corresponding decoding system to synchronize to the bitstream. The configuration unit may be configured to determine one or more independent frames of spatial metadata from the sequence of frames of spatial metadata, which are to be encoded independently, based on the update period.

According to another aspect, a method for generating a bitstream indicative of a downmix signal and spatial metadata for generating a multi-channel upmix signal from the downmix signal is described. The method may comprise generating the downmix signal from a multi-channel input signal. Furthermore, the method may comprise determining one or more control settings based on one or more external settings; wherein the one or more external settings comprise a target data-rate for the bitstream and wherein the one or more control settings comprise a maximum data-rate for the spatial metadata. In addition, the method may comprise determining the spatial metadata from the multi-channel input signal subject to the one or more control settings.

According to a further aspect, a method for determining a spatial metadata frame for generating a frame of a multi-channel upmix signal from a corresponding frame of a downmix signal is described. The method may comprise determining a plurality of spectra from a current frame and a directly following frame of a channel of a multi-channel input signal. Furthermore, the method may comprise weighting the plurality of spectra using a window function to yield a plurality of weighted spectra. In addition, the method may comprise determining the spatial metadata frame for the current frame of the channel of the multi-channel input signal based on the plurality of weighted spectra. The window function may depend on one or more of: a number of sets of spatial parameters comprised within the spatial metadata frame, a presence of a transient in the current frame or in the directly following frame of the multi-channel input signal, and/or a time instant of the transient.

According to a further aspect, a method for determining a spatial metadata frame for generating a frame of a multi-channel upmix signal from a corresponding frame of a downmix signal is described. The method may comprise determining a first plurality of transform coefficients from a frame of a first channel of a multi-channel input signal, and determining a second plurality of transform coefficients from the corresponding frame of a second channel of the multi-channel input signal. As outlined above, the first and second plurality of transform coefficients typically provide a first and second time/frequency representation of the corresponding frames of the first and second channels, respectively. The first and second time/frequency representations may comprise a plurality of frequency bins and a plurality of time bins. A set of spatial parameters may comprise corresponding band parameters for different frequency bands comprising different numbers of frequency bins, respectively. The method may further comprise determining a shift to be applied when determining a particular band parameter for a particular frequency band using fixed point arithmetic. The shift may be determined based on the particular frequency band. Furthermore, the shift may be determined based on the number of time bins to be considered for determining the particular band parameter. In addition, the method may comprise determining the particular band parameter based on the first and second plurality of transform coefficients, which fall within the particular frequency band, using fixed point arithmetic and the determined shift.

A method for generating a bitstream based on a multi-channel input signal is described. The method may comprise generating a sequence of frames of a downmix signal from a corresponding sequence of first frames of the multi-channel input signal. Furthermore, the method may comprise determining a sequence of spatial metadata frames from a sequence of second frames of the multi-channel input signal. The sequence of frames of the downmix signal and the sequence of spatial metadata frames may be for generating a multi-channel upmix signal. In addition, the method may comprise generating the bitstream comprising a sequence of bitstream frames. A bitstream frame may be indicative of a frame of the downmix signal corresponding to a first frame of the sequence of first frames of the multi-channel input signal and a spatial metadata frame corresponding to a second frame of the sequence of second frames of the multi-channel input signal. The second frame may be different from the first frame.

According to a further aspect, a method for generating a bitstream based on a multi-channel input signal is described. The method may comprise determining a sequence of clipping protection gains for a corresponding sequence of frames of the multi-channel input signal. A current clipping protection gain may be indicative of an attenuation to be applied to a current frame of the multi-channel input signal to prevent a corresponding current frame of a downmix signal from clipping. The method may proceed in interpolating the current clipping protection gain and a preceding clipping protection gain of a preceding frame of the multi-channel input signal to yield a clipping protection gain curve. Furthermore, the method may comprise applying the clipping protection gain curve to the current frame of the multi-channel input signal to yield an attenuated current frame of the multi-channel input signal. A current frame of a sequence of frames of the downmix signal may be generated from the attenuated current frame of the multi-channel input signal. In addition, the method may comprise determining a sequence of spatial metadata frames from the multi-channel input signal. The sequence of frames of the downmix signal and the sequence of spatial metadata frames may be used for generating a multi-channel upmix signal. The bitstream may be generated such that the bitstream is indicative of the sequence of clipping protection gains, the sequence of frames of the downmix signal and the sequence of spatial metadata frames, to enable the generation of the multi-channel upmix signal based on the bitstream.

According to a further aspect, a method for generating a bitstream indicative of a downmix signal and spatial metadata for generating a multi-channel upmix signal from the downmix signal is described. The method may comprise generating the downmix signal from a multi-channel input signal. Furthermore, the method may comprise determining one or more control settings based on one or more external settings, wherein the one or more external settings comprise an update period indicative of a time period required by a decoding system to synchronize to the bitstream. The method may further comprise determining a sequence of frames of spatial metadata for a corresponding sequence of frames of the multi-channel input signal, subject to one or more control settings. In addition, the method may comprise encoding one or more frames of spatial metadata from the sequence of frames of spatial metadata as independent frames, in accordance to the update period.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

SHORT DESCRIPTION OF THE FIGURES

The invention is explained below in an exemplary manner with reference to the accompanying drawings, wherein FIG. 1 shows a generalized block diagram of an example audio processing system for performing spatial synthesis;

Figure 5A:
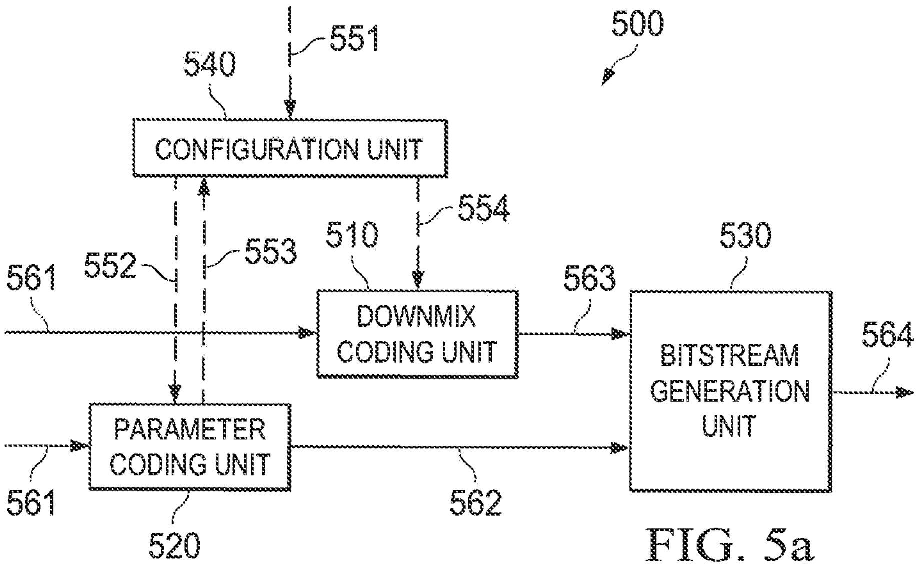
Figure 5B:
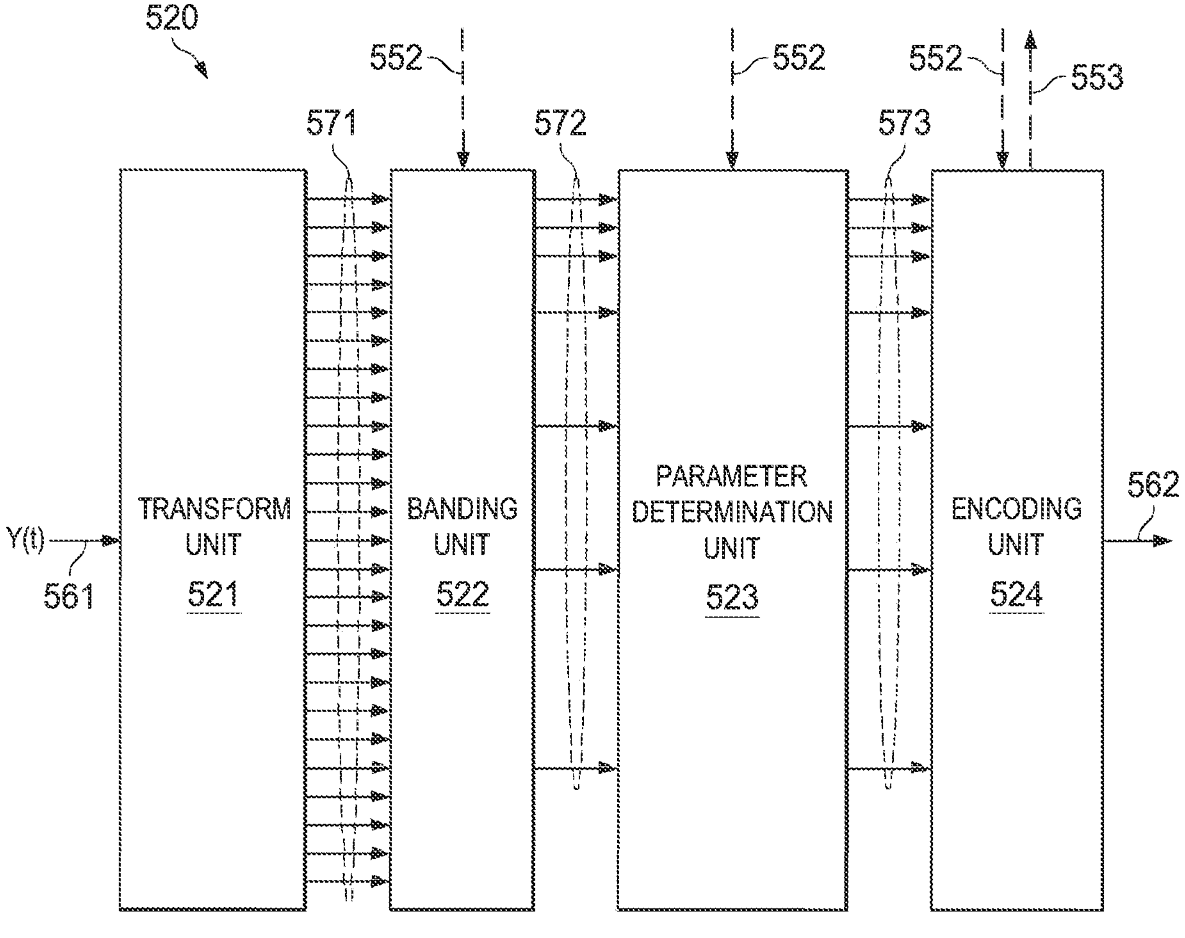
Figure 5C:
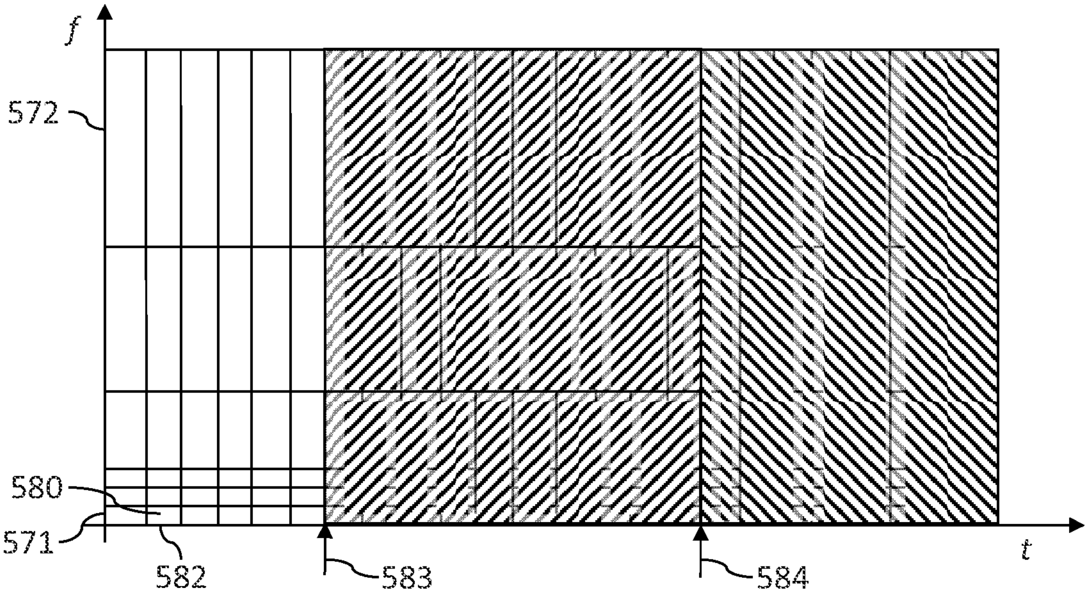
Figure 5D:
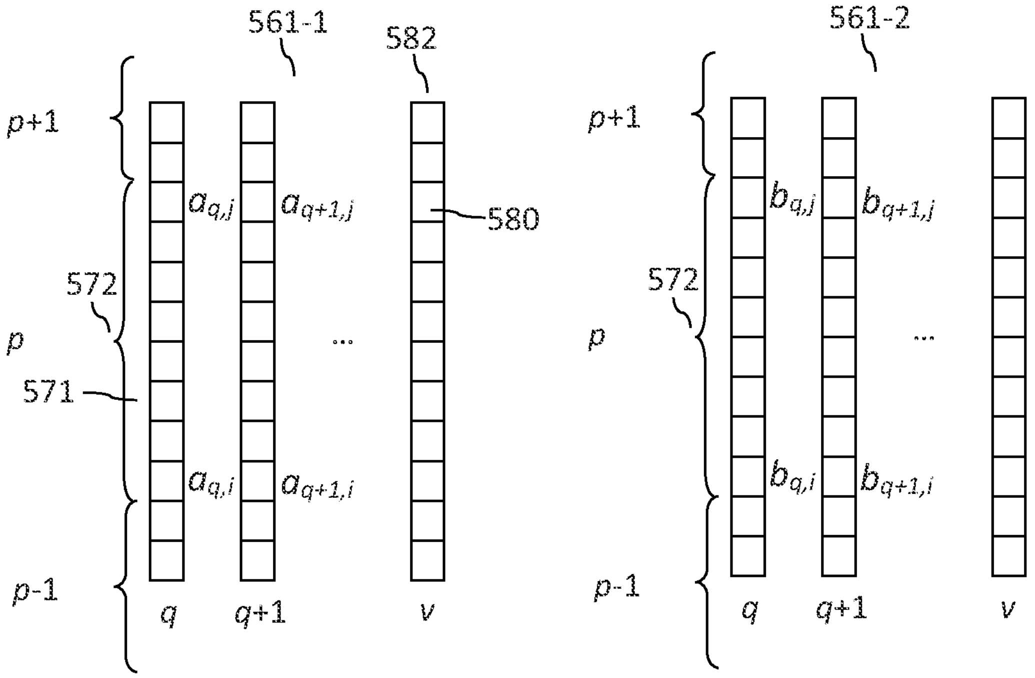
Figure 5E:
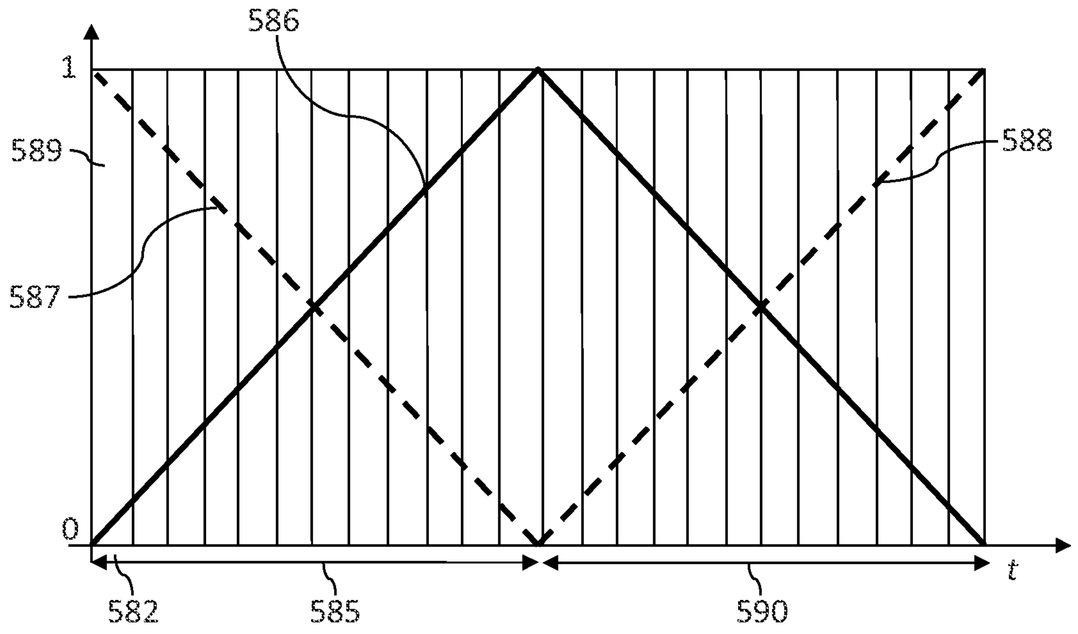

FIG. 5*a* shows a block diagram of an example parametric multi-channel audio encoding system;

FIG. 5*b* shows a block diagram of an example spatial analysis and encoding system;

FIG. 5*c* illustrates an example time-frequency representation of a frame of a channel of a multi-channel audio signal;

FIG. 5*d* illustrates an example time-frequency representation of a plurality of channels of a multi-channel audio signal;

FIG. 5*e* shows an example windowing applied by a transform unit of the spatial analysis and encoding system shown in FIG. 5*b;*

Figure 6:
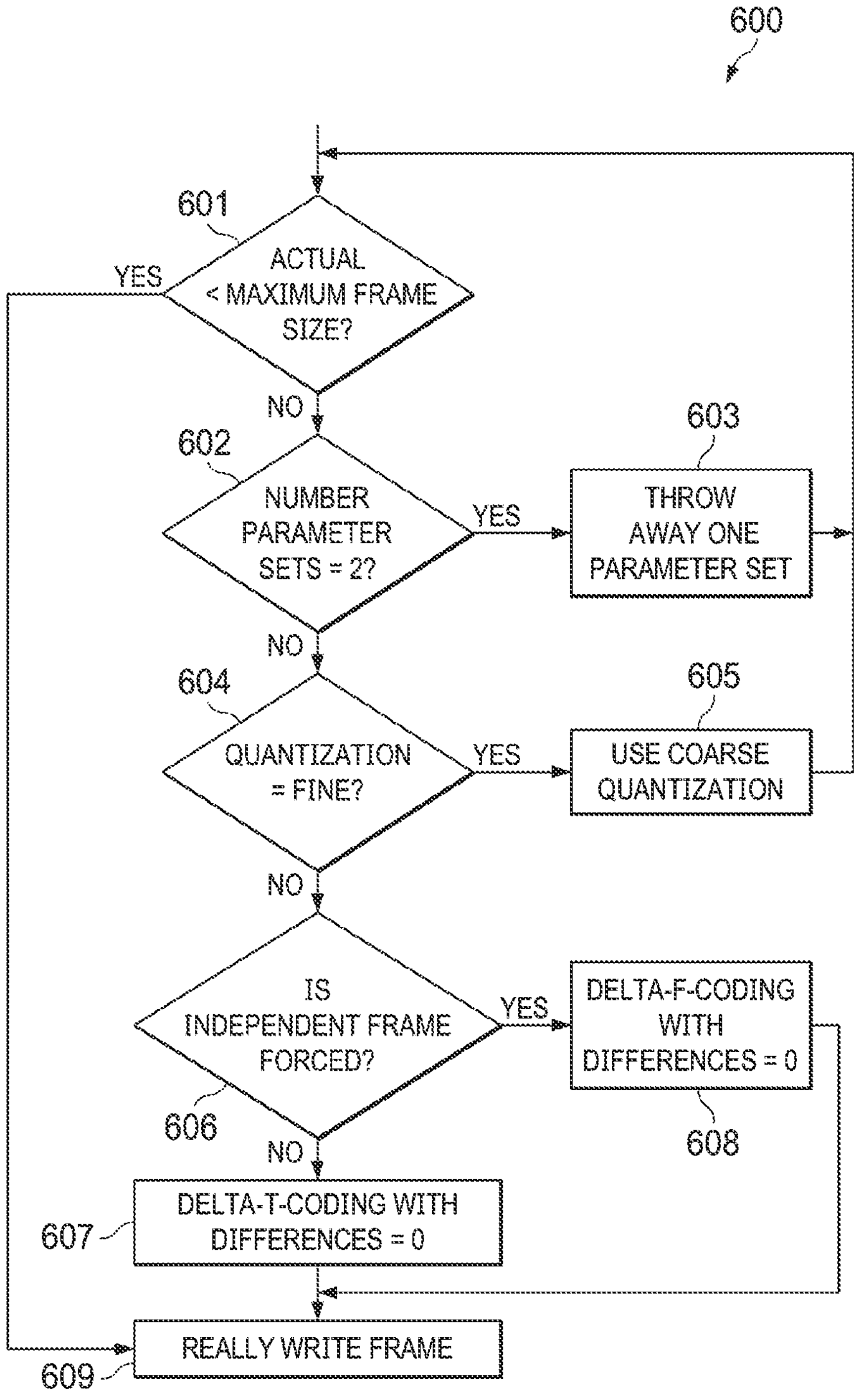
Figure 7A:
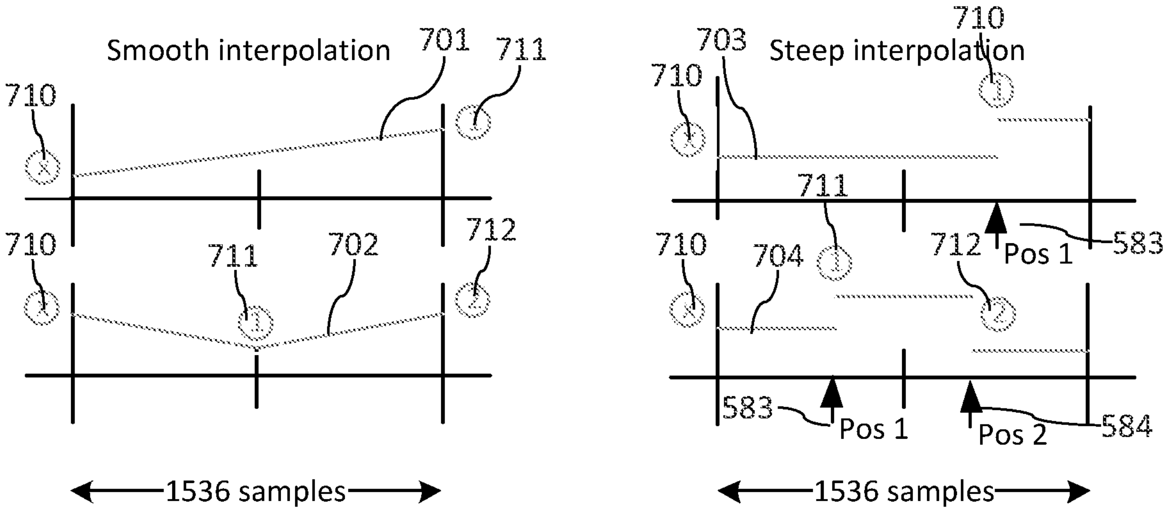
Figure 7B:
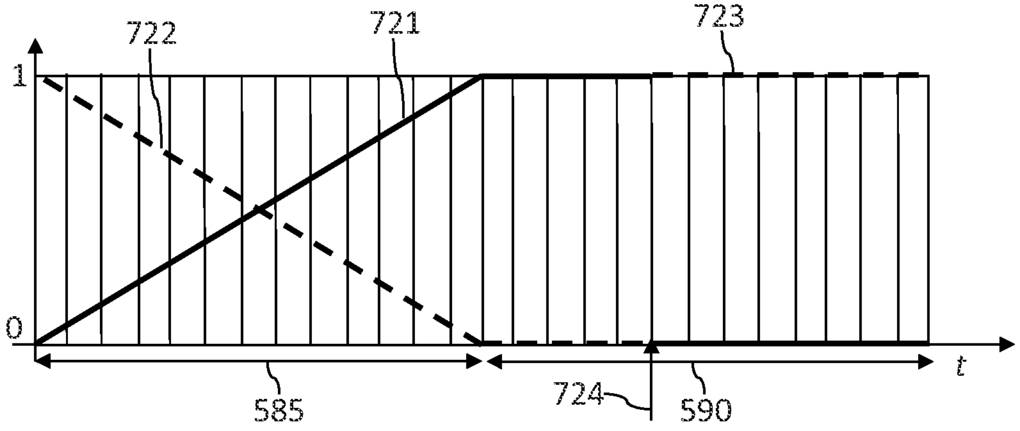
Figure 7C:
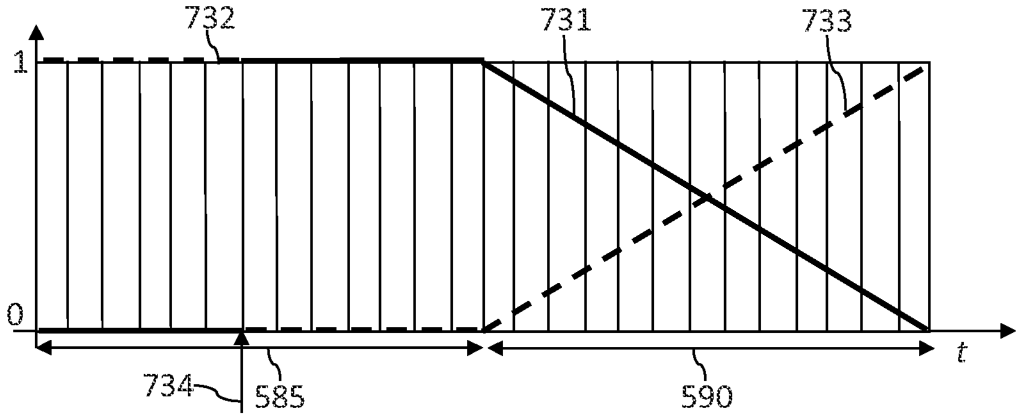
Figure 7D:
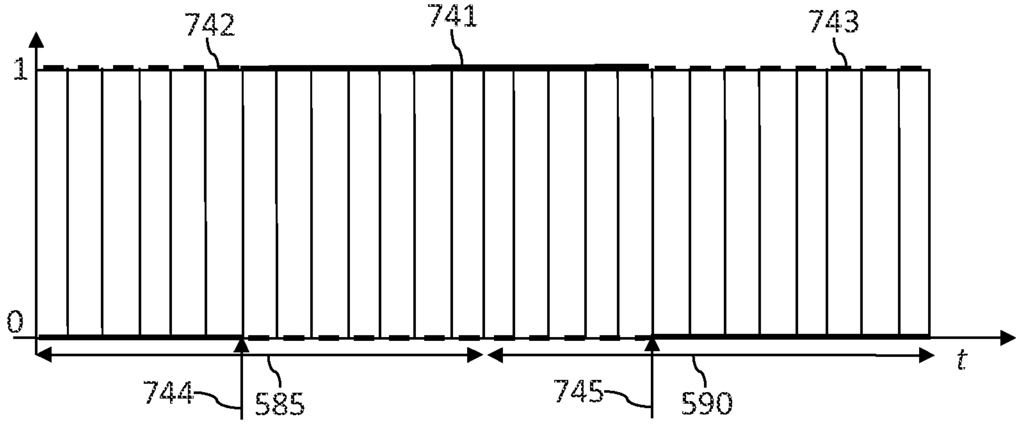
Figure 8:
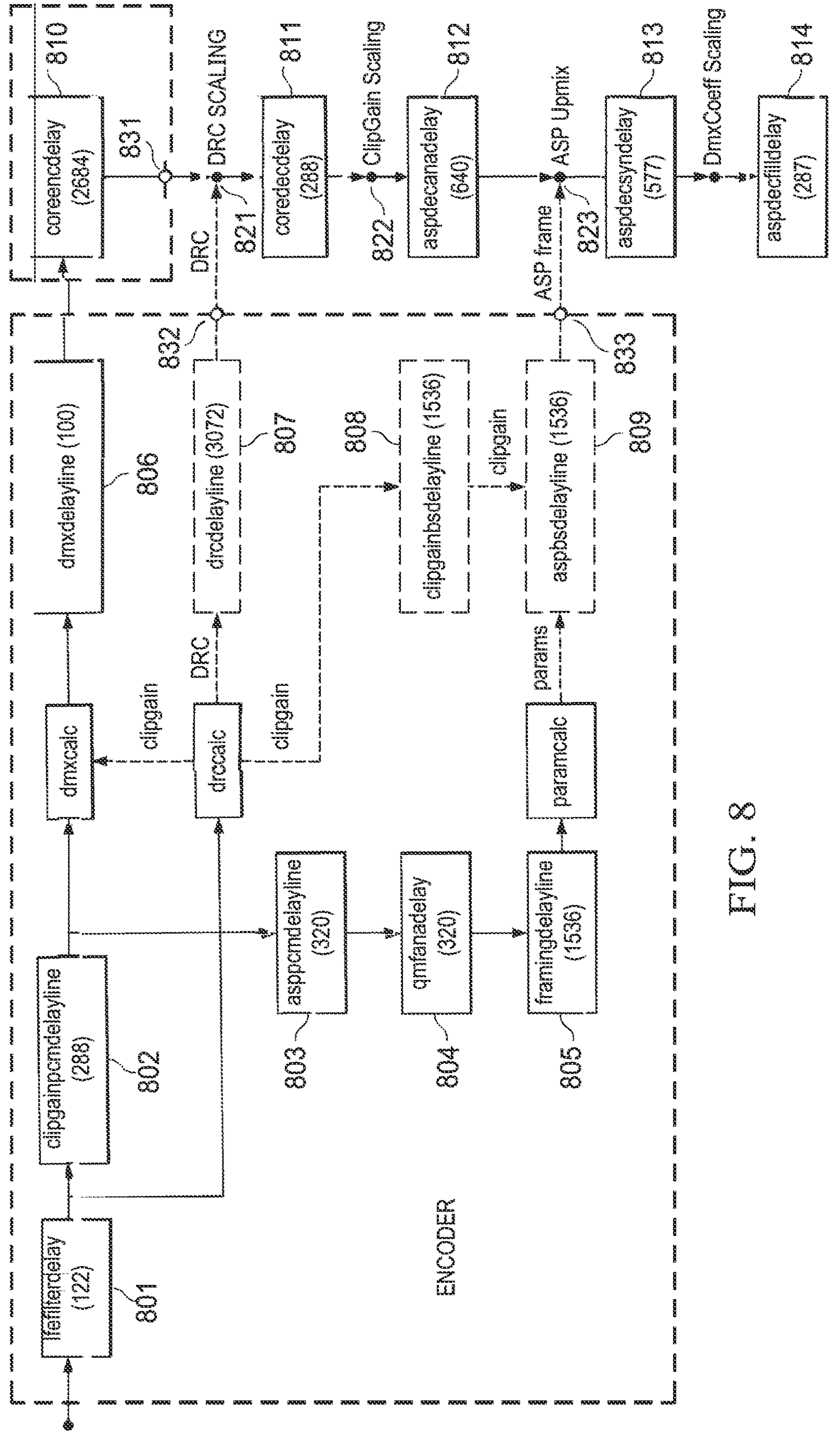
Figure 9A:
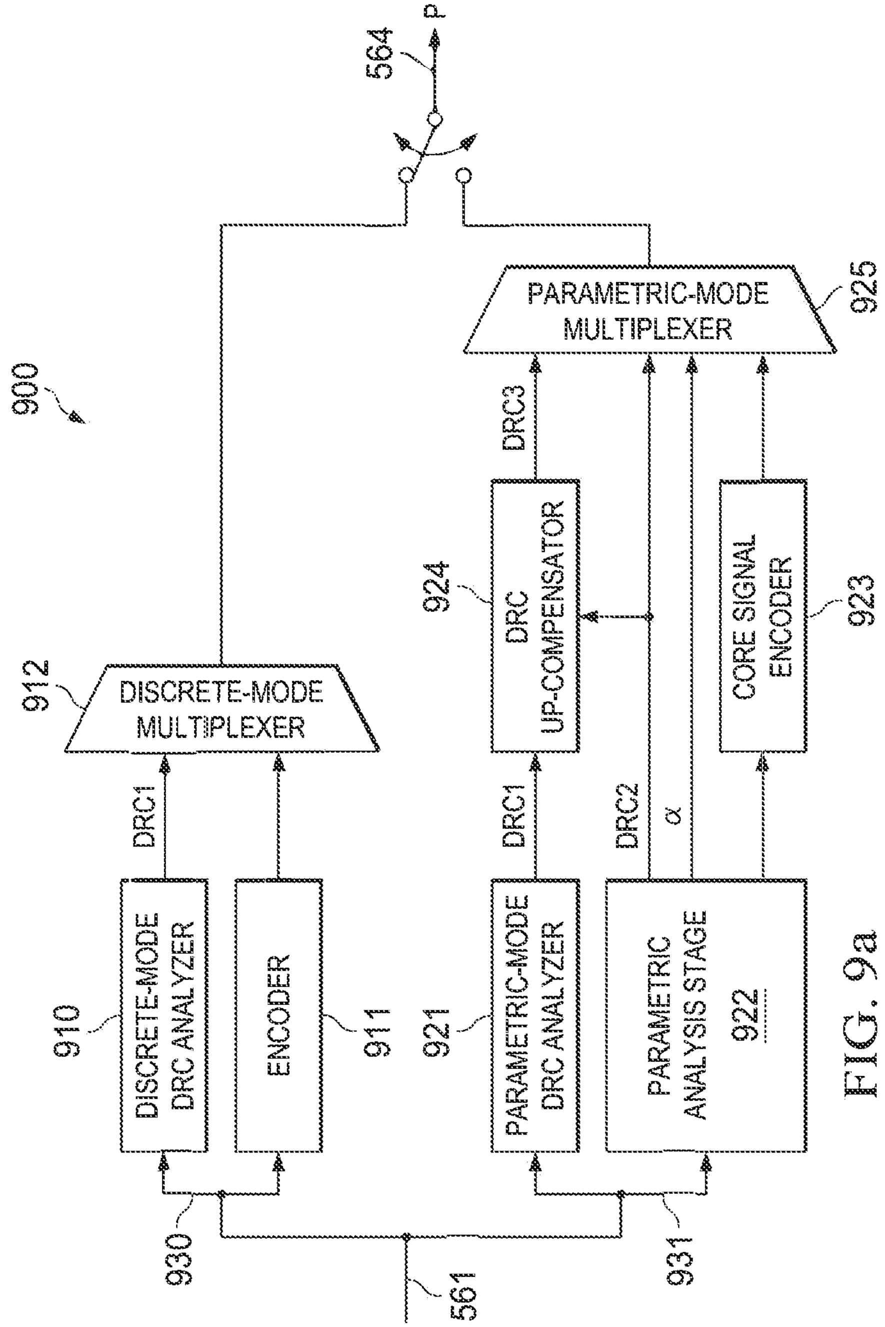
Figure 9B:
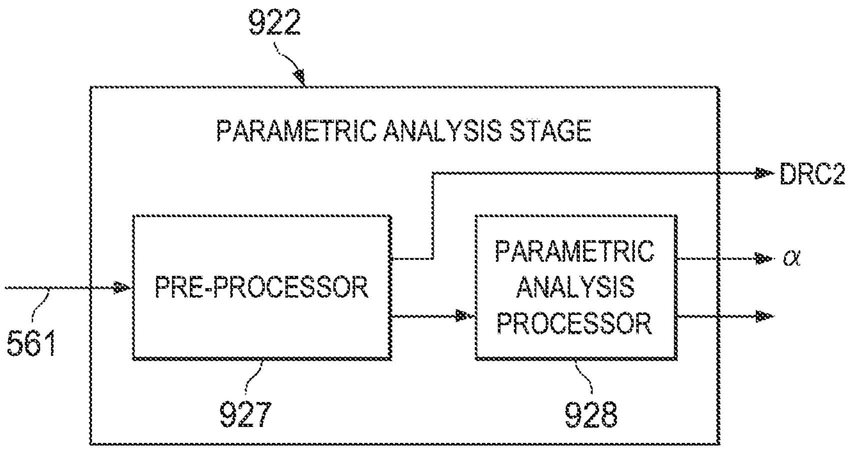
Figure 10:
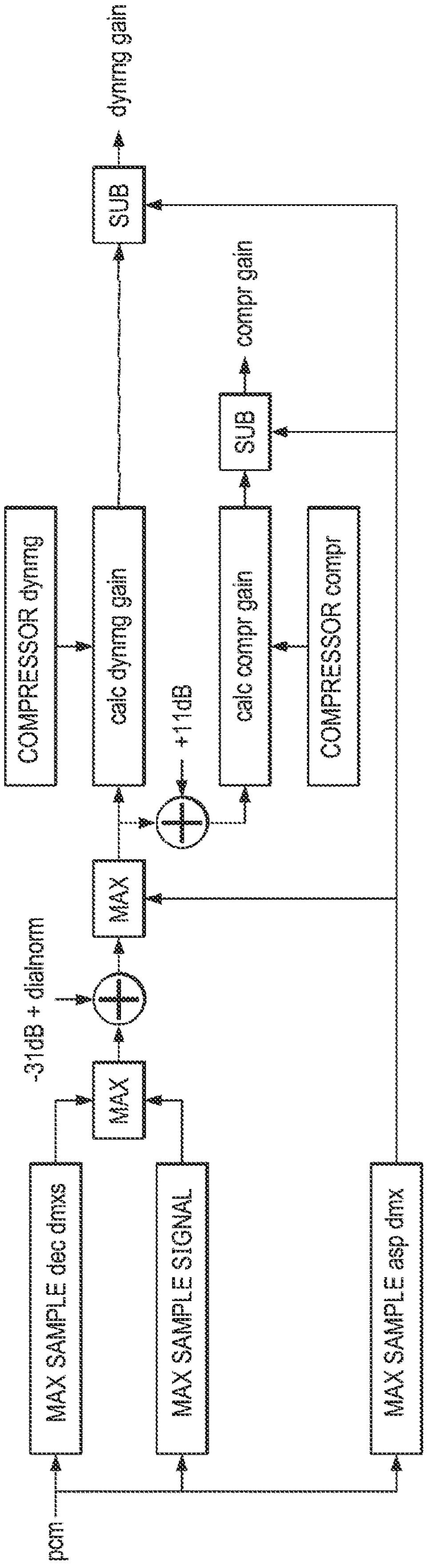

FIG. 6 shows a flow diagram of an example method for reducing the data-rate of spatial metadata;

FIG. 7*a* illustrates example transition schemes for spatial metadata performed at a decoding system;

FIGS. 7*b* to 7*d* illustrate example window functions applied for the determination of spatial metadata;

FIG. 8 shows a block diagram of example processing paths of a parametric multi-channel codec system;

FIGS. 9*a* and 9*b* show block diagrams of an example parametric multi-channel audio encoding system configured to perform clipping protection and/or dynamic range control;

FIG. 10 illustrates an example method for compensating DRC parameters; and

Figure 11:
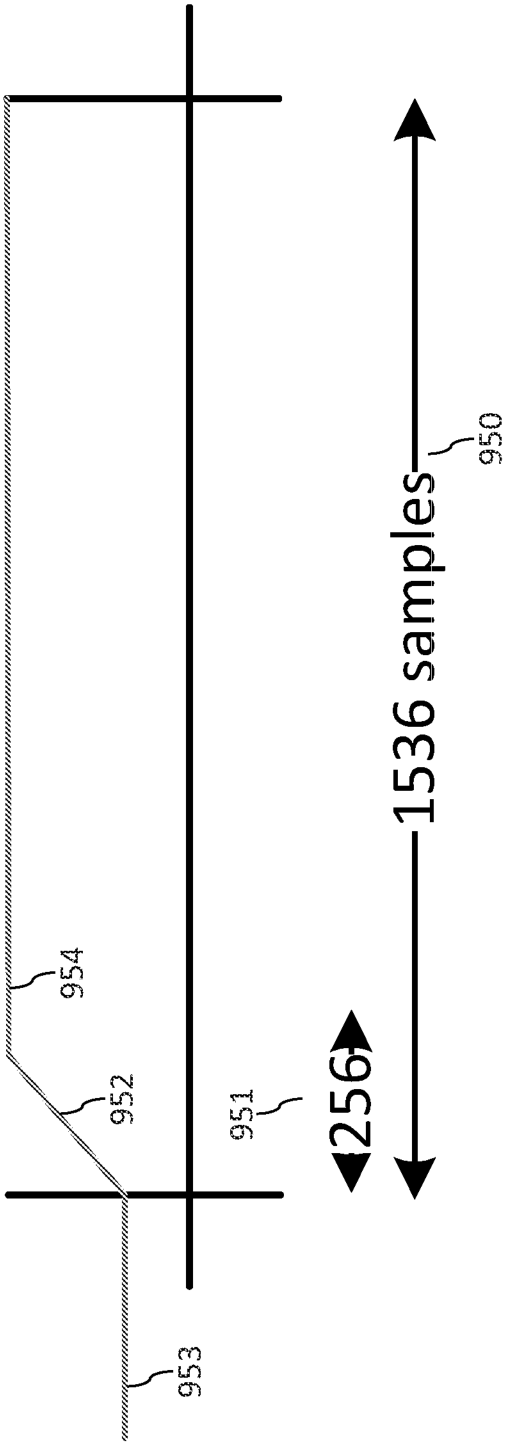

FIG. 11 shows an example interpolation curve for clipping protection.

DETAILED DESCRIPTION

Figure 1:
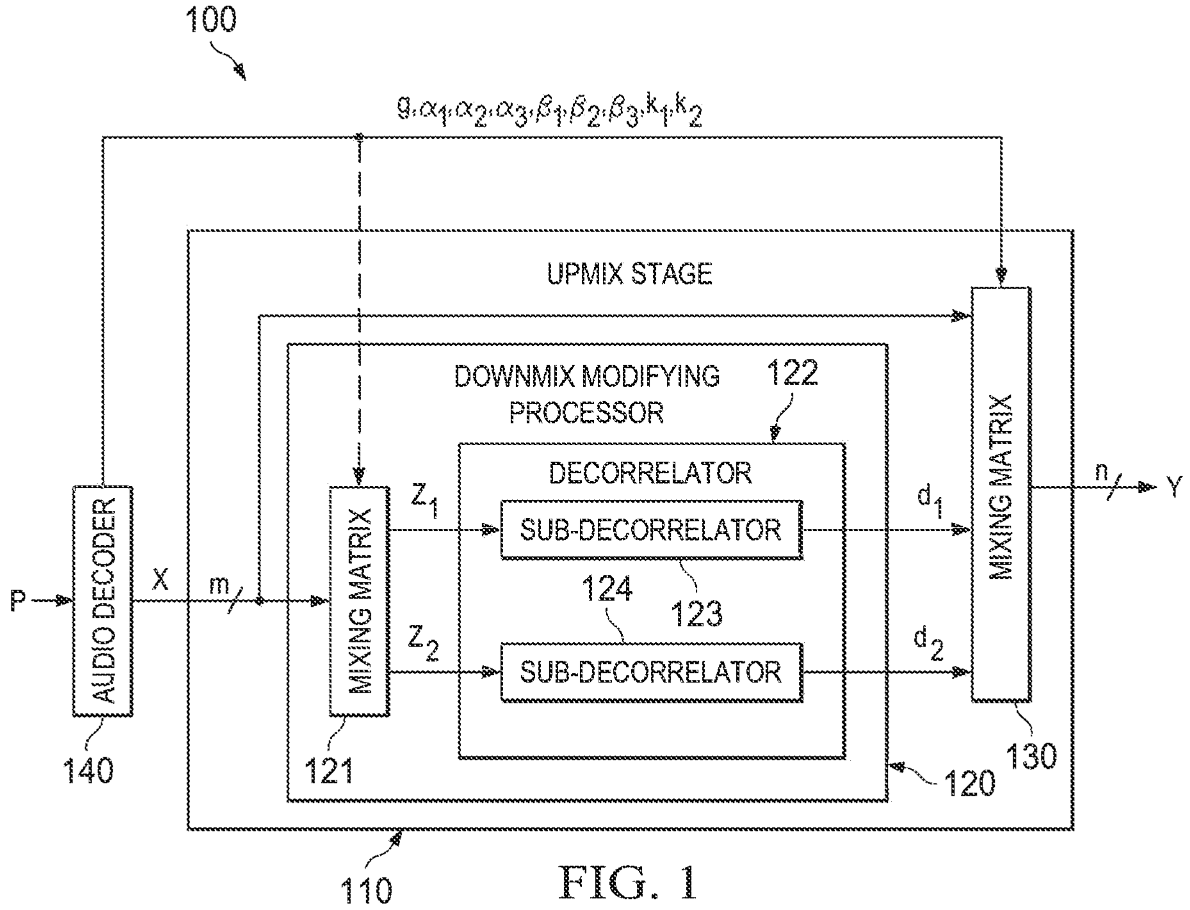
Figure 2:
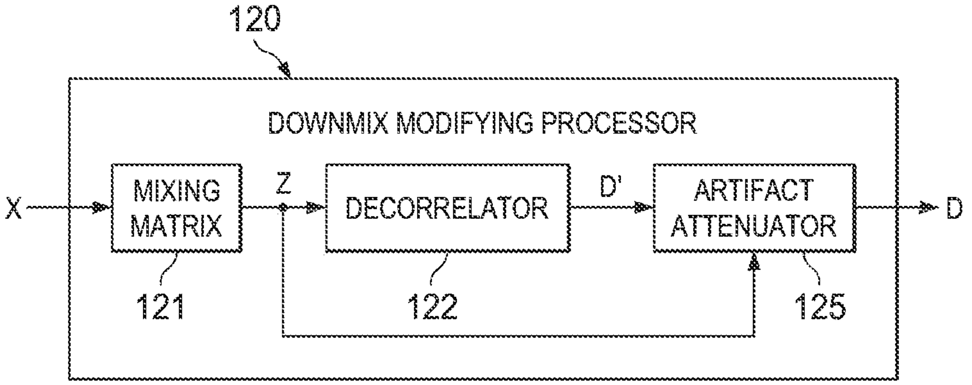
FIG. 2 shows an example detail of the system of FIG. 1.
Figure 3:
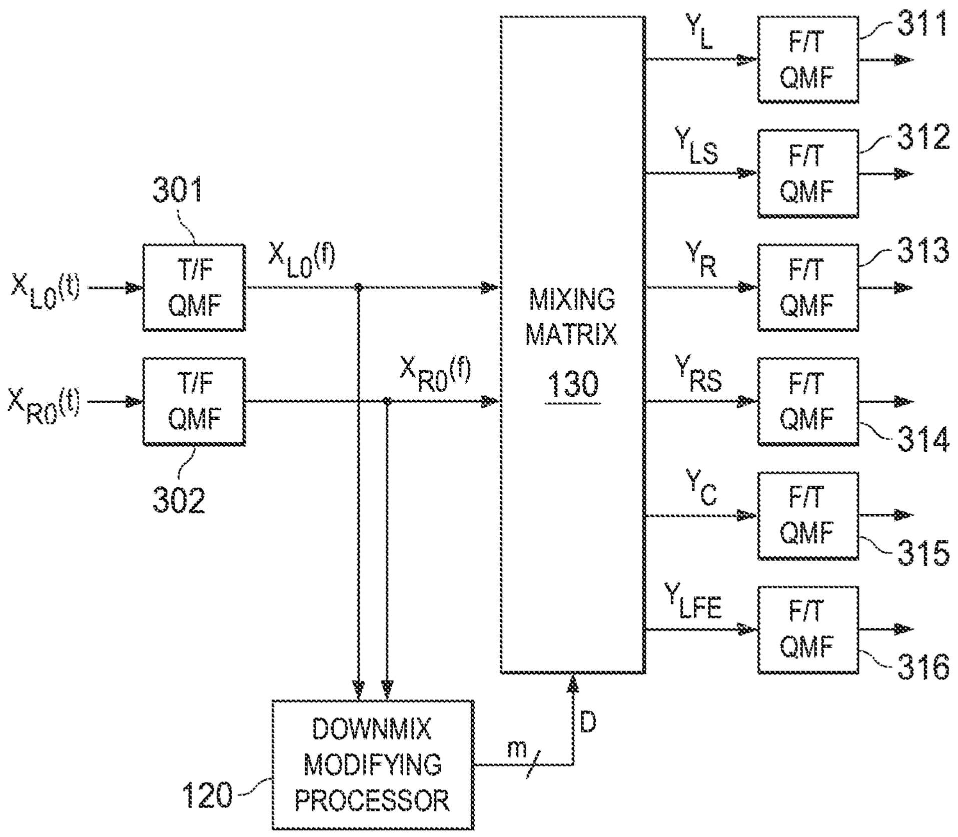
FIG. 3 shows, similarly to FIG. 1, an example audio processing system for performing spatial synthesis.

As outlined in the introductory section, the present document relates to multi-channel audio coding systems which make use of a parametric multi-channel representation. In the following an example multi-channel audio coding and decoding (codec) system is described. In the context of FIGS. 1 to 3, it is described how a decoder of the audio codec system may use a received parametric multi-channel representation to generate an n-channel upmix signal Y (typically n>2) from a received m-channel downmix signal X (e.g. m=2). Subsequently, the encoder related processing of the multi-channel audio codec system is described. In particular, it is described how a parametric multi-channel representation and an m-channel downmix signal may be generated from an n-channel input signal.

FIG. 1 illustrates a block-diagram of an example audio processing system 100 which is configured to generate an upmix signal Y from a downmix signal X and from a set of mixing parameters. In particular, the audio processing system 100 is configured to generate the upmix signal solely based on the downmix signal X and the set of mixing parameters. From a bitstream P, an audio decoder 140 extracts a downmix signal $X=[l_0\ r_0]^T$ and a set of mixing parameters. In the illustrated example, the set of mixing parameters comprises the parameters $\alpha_1$, $\alpha_2$, $\alpha_3$, $\beta_1$, $\beta_2$, $\beta_3$, g, $k_1$, $k_2$. The mixing parameters may be included in quantized and/or entropy encoded form in respective mixing parameter data fields in the bitstream P. The mixing parameters may be referred to as metadata (or spatial metadata) which is transmitted along with the encoded downmix signal X. In some instances of the present disclosure, it has been indicated explicitly that some connection lines are adapted to transmit multi-channel signals, wherein these lines have been provided with a cross line adjacent to the respective number of channels. In the system 100 shown in FIG. 1, the downmix signal X comprises m=2 channels, and an upmix signal Y to be defined below comprises n=6 channels (e.g. 5.1 channels).

An upmix stage 110, the action of which depends parametrically on the mixing parameters, receives the downmix signal. A downmix modifying processor 120 modifies the downmix signal by non-linear processing and by forming a linear combination of the downmix channels, so as to obtain a modified downmix signal $D=[d_1\ d_2]^T$. A first mixing matrix 130 receives the downmix signal X and the modified downmix signal D and outputs an upmix signal $Y=[l_f\ l_s\ r_f\ r_s\ c\ lfe]^T$ by forming the following linear combination:

$$\begin{bmatrix} l_f \\ l_s \\ r_f \\ r_x \\ c \\ lfe \end{bmatrix} = \begin{bmatrix} (g-(\alpha_3+\beta_3))(1+\alpha_1)/2 & -(\alpha_3+\beta_3)(1+\alpha_1)/2 & \beta_1/2 & 0 \\ (g-(\alpha_3+\beta_3))(1+\alpha_1)/2 & -(\alpha_3-\beta_3)(1-\alpha_1)/2 & -\beta_1/2 & 0 \\ -(\alpha_3+\beta_3)(1+\alpha_2)/2 & (g-(\alpha_3-\beta_3))(1+\alpha_2)/2 & 0 & \beta_2/2 \\ -(\alpha_3+\beta_3)(1-\alpha_2)/2 & (g-(\alpha_3-\beta_3))(1-\alpha_2)/2 & 0 & -\beta_2/2 \\ (\alpha_3+\beta_3)k_1 & (\alpha_3-\beta_3)k_1 & 0 & 0 \\ (\alpha_3+\beta_3)k_2 & (\alpha_3-\beta_3)k_2 & 0 & 0 \end{bmatrix} \cdot \begin{bmatrix} l_0 \\ r_0 \\ d_1 \\ d_2 \end{bmatrix}$$

In the above linear combination, the mixing parameter $\alpha_3$ controls the contribution of a mid-type signal (proportional to $l_0+r_0$) formed from the downmix signal to all channels in the upmix signal. The mixing parameter $\beta_3$ controls the contribution of a side-type signal (proportional to $l_0-r_0$) to all channels in the upmix signal. Hence, in a use case, it may be reasonably expected that the mixing parameters $\alpha_3$ and $\beta_3$ will have different statistical properties, which enables more efficient coding. (Considering as a comparison a reference parameterization where independent mixing parameters control respective left-channel and right-channel contributions from the downmix signal to the spatially left and right channels in the upmix signal, it is noted that the statistical observables of such mixing parameters may not differ notably.)

Returning to the linear combination shown in the above equation, it is noted, further, that the gain parameters $k_1$,$k_2$ may be dependent on a common single mixing parameter in the bitstream P. Furthermore, the gain parameters may be normalized such that $k_1^2+k_2^2=1$.

The contributions from the modified downmix signal to the spatially left and right channels in the upmix signal may be controlled separately by parameters $\beta_1$ (first modified channel's contribution to left channels) and $\beta_2$ (second modified channel's contribution to right channels). Further, the contribution from each channel in the downmix signal to its spatially corresponding channels in the upmix signal may be individually controllable by varying the independent mixing parameter g. Preferably, the gain parameter g is quantized nonuniformly so as to avoid large quantization errors.

Referring now additionally to FIG. 2, the downmix modifying processor 120 may perform, in a second mixing matrix 121, the following linear combination (which is a cross mix) of the downmix channels:

$$\begin{bmatrix} z_1 \\ z_2 \end{bmatrix} = \begin{bmatrix} g-(\alpha_3+\beta_3) & -(\alpha_3-\beta_3) \\ -(\alpha_3+\beta_3) & g-(\alpha_3-\beta_3) \end{bmatrix} \cdot \begin{bmatrix} l_0 \\ r_0 \end{bmatrix}$$

As indicated by the formula, the gains populating the second mixing matrix may depend parametrically on some of the mixing parameters encoded in the bitstream P. The processing carried out by the second mixing matrix 121 results in an intermediate signal $Z=[z_1\ z_2]^T$, which is supplied to a decorrelator 122. FIG. 1 shows an example in which the decorrelator 122 comprises two sub-decorrelators 123, 124, which may be identically configured (i.e., providing identical outputs in response to identical inputs) or differently configured. As an alternative to this, FIG. 2 shows an example in which all decorrelation-related operations are carried out by a single unit 122, which outputs a preliminary modified downmix signal D'. The downmix modifying processor 120 in FIG. 2 may further include an artifact attenuator 125. In an example embodiment, as outlined above, the artifact attenuator 125 is configured to detect sound endings in the intermediate signal Z and to take corrective action by attenuating, based on the detected locations of the sound endings, undesirable artifacts in this signal. This attenuation produces the modified downmix signal D, which is output from the downmix modifying processor 120.

FIG. 3 shows a first mixing matrix 130 of a similar type as the one shown in FIG. 1 and its associated transform stages 301, 302 and inverse transform stages 311, 312, 313, 314, 315, 316. The transform stages may e.g. comprise filterbanks such as Quadrature Mirror Filterbanks (QMF). Hence, the signals located upstream of the transform stages 301, 302 are representations in the time domain, as are the signals located downstream of the inverse transform stages 311, 312, 313, 314, 315, 316. The other signals are frequency-domain representations. The time-dependency of the other signals may for instance be expressed as discrete values or blocks of values relating to time blocks into which the signal is segmented. It is noted that FIG. 3 uses alternative notation in comparison with the matrix equations above; one may for instance have the correspondences $X_{L0}\sim l_0$, $X_{R0}\sim r_0$, $Y_L\sim l_f$, $Y_{Ls}\sim l_s$ and so forth. Further, the notation in FIG. 3 emphasizes the distinction between a time-domain representation $X_{L0}(t)$ of a signal and the frequency-domain representation $X_{L0}(f)$ of the same signal. It is understood that the frequency-domain representation is segmented into time frames; hence, it is a function both of a time and a frequency variable.

Figure 4:
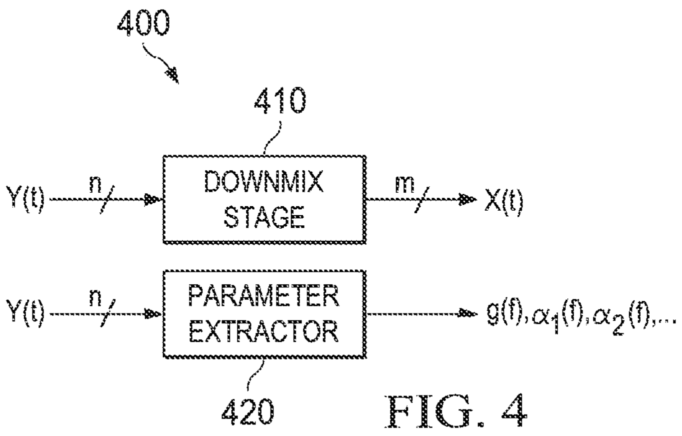
FIG. 4 shows an example audio processing system for performing spatial analysis.

FIG. 4 shows an audio processing system 400 for generating the downmix signal X and the mixing parameters $\alpha_1$, $\alpha_2$, $\alpha_3$, $\beta_1$, $\beta_2$, $\beta_3$, g, $k_1$, $k_2$ controlling the gains applied by the upmix stage 110. This audio processing system 400 is typically located on an encoder side, e.g., in broadcasting or recording equipment, whereas the system 100 shown in FIG. 1 is typically to be deployed on a decoder side, e.g., in playback equipment. A downmix stage 410 produces an m-channel signal X on the basis of an n-channel signal Y. Preferably, the downmix stage 410 operates on time-domain representations of these signals. A parameter extractor 420 may produce values of the mixing parameters $\alpha_1$, $\alpha_2$, $\alpha_3$, $\beta_1$, $\beta_2$, $\beta_3$, g, $k_1$, $k_2$ by analyzing the n-channel signal Y and taking into account the quantitative and qualitative properties of the downmix stage 410. The mixing parameters may be vectors of frequency-block values, as the notation in FIG. 4 suggests, and may be further segmented into time blocks. In an example implementation, the downmix stage 410 is time-invariant and/or frequency-invariant. By virtue of the time invariance and/or frequency invariance, there is typically no need for a communicative connection between the downmix stage 410 and the parameter extractor 420, but the parameter extraction may proceed independently. This provides great latitude for the implementation. It also gives a possibility to reduce the total latency of the system since several processing steps may be carried out in parallel. As one example, the Dolby Digital Plus format (or Enhanced AC-3) may be used for coding the downmix signal X.

The parameter extractor 420 may have knowledge of the quantitative and/or qualitative properties of the downmix stage 410 by accessing a downmix specification, which may specify one of: a set of gain values, an index identifying a predefined downmixing mode for which gains are predefined, etc. The downmix specification may be a data record pre-loaded into memories in each of the downmix stage 410 and the parameter extractor 420. Alternatively or in addition, the downmix specification may be transmitted from the downmix stage 410 to the parameter extractor 420 over a communication line connecting these units. As a further alternative, each of the downmix stage 410 to the parameter extractor 420 may access the downmix specification from a common data source, such as a memory (e.g. of the configuration unit 540 shown in FIG. 5*a*) in the audio processing system or in a metadata stream associated with the input signal Y.

FIG. 5*a* shows an example multi-channel encoding system 500 for encoding a multi-channel audio input signal Y 561 (comprising n channels) using a downmix signal X (comprising m channels, with $m<n$) and a parametric representation. The system 500 comprises a downmix coding unit 510 which comprises e.g. the downmix stage 410 of FIG. 4. The downmix coding unit 510 may be configured to provide an encoded version of the downmix signal X. The downmix coding unit 510 may e.g. make use of a Dolby Digital Plus encoder for encoding the downmix signal X. Furthermore, the system 500 comprises a parameter coding unit 510 which may comprise the parameter extractor 420 of FIG. 4. The parameter coding unit 510 may be configured to quantize and encode the set of mixing parameters $\alpha_1$, $\alpha_2$, $\alpha_3$, $\beta_1$, $\beta_2$, $\beta_3$, g, $k_1$ (also referred to as spatial parameters) to yield encoded spatial parameters 562. As indicated above, the parameter $k_2$ may be determined from the parameter $k_1$. In addition, the system 500 may comprise a bitstream generation unit 530 which is configured to generate the bitstream P 564 from the encoded downmix signal 563 and from the encoded spatial parameters 562. The bitstream 564 may be encoded in accordance to a pre-determined bitstream syntax. In particular, the bitstream 564 may be encoded in a format conforming to Dolby Digital Plus (DD+ or E-AC-3, Enhanced AC-3).

The system 500 may comprise a configuration unit 540 which is configured to determine one or more control settings 552, 554 for the parameter coding unit 520 and/or for downmix coding unit 510. The one or more control settings 552, 554 may be determined based on one or more external settings 551 of the system 500. By way of example, the one or more external settings 551 may comprise an overall (maximum or fixed) data-rate of the bitstream 564. The configuration unit 540 may be configured to determine one or more control settings 552 in dependence on the one or more external settings 551. The one or more control settings 552 for the parameter coding unit 520 may comprise one or more of the following:

- a maximum data-rate for the encoded spatial parameters 562. This control setting is referred to herein as the metadata data-rate setting).
- a maximum number and/or a specific number of parameter sets to be determined by the parameter coding unit 520 per frame of the audio signal 561. This control setting is referred to herein as the temporal resolution setting, as it allows influencing the temporal resolution of the spatial parameters.
- a number of parameter bands for which spatial parameters are to be determined by the parameter coding unit 520. This control setting is referred to herein as the frequency resolution setting, as it allows influencing the frequency resolution of the spatial parameters.
- a resolution of the quantizer used for quantizing the spatial parameters. This control setting is referred to herein as the quantizer setting.

The parameter coding unit 520 may use one or more of the above mentioned control settings 552 for determining and/or for encoding the spatial parameters, which are to be included into the bitstream 564. Typically, the input audio signal Y 561 is segmented into a sequence of frames, wherein each frame comprises a pre-determined number of samples of the input audio signal Y 561. The metadata data-rate setting may indicate the maximum number of bits which are available for encoding the spatial parameters of a frame of the input audio signal 561. The actual number of bits used for encoding the spatial parameters 562 of a frame may be lower than the number of bits allocated by the metadata data-rate setting. The parameter coding unit 520 may be configured to inform the configuration unit 540 about the actually used number of bits 553, thereby enabling the configuration unit 540 to determine the number of bits which are available for encoding the downmix signal X. This number of bits may be communicated to the downmix encoding unit 510 as a control setting 554. The downmix encoding unit 510 may be configured to encode the downmix signal X based on the control setting 554 (e.g. using a multi-channel encoder such as Dolby Digital Plus). As such, bits which have not been used for encoding the spatial parameters may be used for encoding the downmix signal.

FIG. 5*b* shows a block diagram of an example parameter coding unit 520. The parameter coding unit 520 may comprise a transform unit 521 which is configured to determine a frequency representation of the input signal 561. In particular, the transform unit 521 may be configured to transform a frame of the input signal 561 into one or more spectra, each comprising a plurality of frequency bins. By way of example, the transform unit 521 may be configured to apply a filterbank, e.g. a QMF filterbank, to the input signal 561. The filterbank may be a critically sampled filterbank. The filterbank may comprise a pre-determined number Q of filters (e.g. Q=64 filters). As such, the transform unit 521 may be configured to determined Q subband signals from the input signal 561, wherein each subband signal is associated with a corresponding frequency bin 571. By way of example, a frame of K samples of the input signal 561 may be transformed into Q subband signals with K/Q frequency coefficients per subband signal. In other words, a frame of K samples of the input signal 561 may be transformed into K/Q spectra, with each spectrum comprising Q frequency bins. In a specific example the frame length is K=1536, the number of frequency bins is Q=64 and the number of spectra K/Q=24.

The parameter coding unit 520 may comprise a banding unit 522 configured to group one or more frequency bins 571 into frequency bands 572. The grouping of frequency bins 571 into frequency bands 572 may depend on the frequency resolution setting 552. Table 1 illustrates an example mapping of frequency bins 571 to frequency bands 572, wherein the mapping may be applied by the banding unit 522 based on the frequency resolution setting 552. In the illustrated example, the frequency resolution setting 552 may indicate the banding of the frequency bins 571 into 7, 9, 12 or 15 frequency bands. The banding typically models the psychoacoustic behavior of the human ear. As a result of this, the number of frequency bins 571 per frequency band 572 typically increases with increasing frequency.

TABLE 1

| QMF | Number of parameter bands | | | |
|---|---|---|---|---|
| bands groups | 15 parameter bands | 12 parameter bands | 9 parameter bands | 7 parameter bands |
| 0 | 0 | 0 | 0 | 0 |
| 1 | 1 | 1 | 1 | 1 |
| 2 | 2 | 2 | 2 | 2 |
| 3 | 3 | 3 | 2 | 2 |
| 4 | 4 | 4 | 3 | 3 |
| 5 | 5 | 4 | 4 | 3 |
| 6 | 6 | 5 | 4 | 3 |
| 7 | 7 | 5 | 5 | 3 |
| 8 | 8 | 6 | 5 | 4 |
| 9-10 | 9 | 6 | 6 | 4 |
| 11-12 | 10 | 7 | 6 | 4 |
| 13-14 | 11 | 8 | 7 | 5 |
| 15-16 | 12 | 9 | 7 | 5 |
| 17-19 | 13 | 10 | 8 | 6 |
| 20-63 | 14 | 11 | 8 | 6 |

A parameter determination unit 523 of the parameter coding unit 520 (and in particular, the parameter extractor 420) may be configured to determine one or more sets of mixing parameters $\alpha_1$, $\alpha_2$, $\alpha_3$, $\beta_1$, $\beta_2$, $\beta_3$, g, $k_1$, $k_2$ for each of the frequency bands 572. Due to this, the frequency bands 572 may also be referred to as parameter bands. The mixing parameters $\alpha_1$, $\alpha_2$, $\alpha_3$, $\beta_1$, $\beta_2$, $\beta_3$, g, $k_1$, $k_2$ for a frequency band 572 may be referred to as the band parameters. As such, a complete set of mixing parameters typically comprises band parameters for each frequency band 572. The band parameters may be applied in the mixing matrix 130 of FIG. 3 to determine subband versions of the decoded upmix signal.

The number of sets of mixing parameters per frame, which are to be determined by the parameter determination unit 523 may be indicated by the time resolution setting 552. By way of example, the time resolution setting 552 may indicate that one or two sets of mixing parameters are to be determined per frame.

The determination of a set of mixing parameters comprising band parameters for a plurality of frequency bands 572 is illustrated in FIG. 5*c*. FIG. 5*c* illustrates an example set of transform coefficients 580 derived from a frame of the input signal 561. A transform coefficient 580 corresponds to a particular time instant 582 and a particular frequency bin 571. A frequency band 572 may comprise a plurality of transform coefficients 580 from one or more frequency bins 571. As can be seen from FIG. 5*c*, the transformation of the time domain samples of the input signal 561 provides a time-frequency representation of the frame of the input signal 561.

It should be noted that the set of mixing parameters for a current frame may be determined based on the transform coefficients 580 of the current frame and possibly also based on the transform coefficients 580 of a directly following frame (also referred to as the look-ahead frame).

The parameter determination unit 523 may be configured to determine mixing parameters $\alpha_1$, $\alpha_2$, $\alpha_3$, $\beta_1$, $\beta_2$, $\beta_3$, g, $k_1$, $k_2$ for each frequency band 572. If the temporal resolution setting is set to one, all the transform coefficients 580 (of the current frame and of the look-ahead frame) of a particular frequency band 572 may be considered for determining the mixing parameters for the particular frequency band 572. On the other hand, the parameter determination unit 523 may be configured to determine two sets of mixing parameters per frequency band 572 (e.g. when the temporal resolution setting is set to two). In this case, the first temporal half of transform coefficients 580 of the particular frequency band 572 (corresponding e.g. to the transform coefficients 580 of the current frame) may be used for determining the first set of mixing parameters and the second temporal half of transform coefficients 580 of the particular frequency band 572 (corresponding e.g. to the transform coefficients 580 of the look-ahead frame) may be considered for determining the second set of mixing parameters.

In general terms, the parameter determination unit 523 may be configured to determine one or more sets of mixing parameters based on the transform coefficients 580 of the current frame and of the look-ahead frame. A window function may be used to define the influence of the transform coefficients 580 on the one or more sets of mixing parameters. The shape of the window function may depend on the number of sets of mixing parameters per frequency band 572 and/or on properties of the current frame and/or the look-ahead frame (e.g. the presence of one or more transients). Example window functions will be described in the context of FIG. 5*e* and FIGS. 7*b* to 7*d*.

It should be noted that the above may apply in cases where the frame of the input signal 561 does not comprise transient signal portions. The system 500 (e.g. the parameter determination unit 523) may be configured to perform transient detection based on the input signal 561. In case one or more transients are detected, one or more transient indicators 583, 584 may be set, wherein the transient indicators 583, 584 may identify the time instants 582 of the corresponding transients. The transient indicators 583, 584 may also be referred to as sampling points of the respective sets of mixing parameters. In case of a transient, the parameter determination unit 523 may be configured to determine a set of mixing parameters based on the transform coefficients 580 starting from the time instant of the transient (this is illustrated by the differently hatched areas of FIG. 5*c*). On the other hand, transform coefficients 580 preceding the time instant of the transient may be ignored, thereby ensuring that the set of mixing parameters reflects the multi-channel situation subsequent to the transient.

FIG. 5*c* illustrates the transform coefficients 580 of a channel of the multi-channel input signal Y 561. The parameter coding unit 520 is typically configured to determine transform coefficients 580 for the plurality of channels of the multi-channel input signal 561. FIG. 5*d* shows example transform coefficients of a first 561-1 and a second 561-2 channel of the input signal 561. A frequency band p 572 comprises the frequency bins 571 ranging from frequency indexes i to j. A transform coefficient 580 of the first channel 561-1 at time instant (or in the spectrum) q and in frequency bin i may be referred to as $a_{q,i}$. In a similar manner, a transform coefficient 580 of the second channel 561-2 at time instant (or in the spectrum) q and in frequency bin i may be referred to as $b_{q,i}$. The transform coefficients 580 may be complex numbers. The determination of a mixing parameter for the frequency band p may involve the determination of energies and/or covariance of the first and second channels 561-1, 561-2 based on the transform coefficients 580. By way of example, the covariance of the transform coefficients 580 of the first and second channels 561-1, 561-2 in the frequency band p and for the time interval [q,v] may be determined as:

$$E_{1,2}(p)=\Sigma_{t=q}^{v}\Sigma_{f=i}^{j}\,\mathrm{Re}\{a_{t,f}\}\mathrm{Re}\{b_{t,f}\}+\mathrm{Im}\{a_{t,f}\}\mathrm{Im}\{b_{t,f}\}.$$

The energy estimate of the transform coefficients 580 of the first channels 561-1 in the frequency band p and for the time interval [q,v] may be determined as:

$$E_{1,1}(p)=\Sigma_{t=q}^{v}\Sigma_{f=i}^{j}\,\mathrm{Re}\{a_{t,f}\}\mathrm{Re}\{a_{t,f}\}+\mathrm{Im}\{a_{t,f}\}\mathrm{Im}\{a_{t,f}\}.$$

The energy estimate $E_{2,2}(p)$ of the transform coefficients 580 of the second channels 561-2 in the frequency band p and for the time interval [q,v] may be determined in a similar manner.

As such, the parameter determination unit 523 may be configured to determine one or more sets 573 of band parameters for the different frequency bands 572. The number of frequency bands 572 typically depends on the frequency resolution setting 552 and the number of sets of mixing parameters per frame typically depends on the time resolution setting 552. By way of example, the frequency resolution setting 552 may indicate the use of 15 frequency bands 572 and the time resolution setting 552 may indicate the use of 2 sets of mixing parameters. In this case, the parameter determination unit 523 may be configured to determined two temporally distinct sets of mixing parameters, wherein each set of mixing parameters comprises 15 sets 573 of band parameters (i.e. mixing parameters for the different frequency bands 572).

As indicated above, the mixing parameters for a current frame may be determined based on the transform coefficients 580 of the current frame and based on the transform coefficients 580 of a following look-ahead frame. The parameter determination unit 523 may apply a window to the transform coefficient 580, in order to ensure a smooth transition between the mixing parameters of succeeding frames of the sequence of frames and/or in order to account for disruptive portions within the input signal 561 (e.g. transients). This is illustrated in FIG. 5*e* which shows the K/Q spectra 589 at corresponding K/Q succeeding time instants 582 of a current frame 585 and of a directly following frame 590 of the input audio signal 561. Furthermore, FIG. 5*e* shows an example window 586 used by the parameter determination unit 523. The window 586 reflects the influence of the K/Q spectra 589 of the current frame 585 and of the directly following frame 590 (referred to as the look-ahead frame) on the mixing parameters. As will be outlined in further detail below, the window 586 reflects the case where the current frame 585 and the look-ahead frame 590 do not comprise any transients. In this case, the window 586 ensures a smooth phase-in and phase-out of the spectra 589 of the current frame 585 and the look-ahead frame 590, respectively, thereby allowing for a smooth evolution of the spatial parameters. Furthermore, FIG. 5*e* shows example windows 587 and 588. The dashed window 587 reflects the influence of the K/Q spectra 589 of the current frame 585 on the mixing parameters of the preceding frame. In addition, the dashed window 588 reflects the influence of the K/Q spectra 589 of the directly following frame 590 on the mixing parameters of the directly following frame 590 (in case of smooth interpolation).

The one or more sets of mixing parameters may subsequently be quantized and encoded using an encoding unit 524 of the parameter coding unit 520. The encoding unit 524 may apply various encoding schemes. By way of example, the encoding unit 524 may be configured to perform differential encoding of the mixing parameters. The differential encoding may be based on temporal differences (between a current mixing parameter and a preceding corresponding mixing parameter, for the same frequency band 572) or on frequency differences (between the current mixing parameter of a first frequency band 572 and the corresponding current mixing parameter of an adjacent second frequency band 572).

Furthermore, the encoding unit 524 may be configured to quantize the set of mixing parameters and/or the temporal or frequency differences of the mixing parameters. The quantization of the mixing parameters may depend on the quantizer setting 552. By way of example, the quantizer setting 552 may take on two values, a first value indicating a fine quantization and a second value indicating a coarse quantization. As such, the encoding unit 524 may be configured to perform a fine quantization (with a relatively low quantization error) or a coarse quantization (with a relatively increased quantization error) based on the quantization type indicated by the quantizer setting 552. The quantized parameters or parameter differences may then be encoded using an entropy-based code such as a Huffman code. As a result, the encoded spatial parameters 562 are obtained. The number of bits 553 which are used for the encoded spatial parameters 562 may be communicated to the configuration unit 540.

In an embodiment, the encoding unit 524 may be configured to first quantize the different mixing parameters (under consideration of the quantizer setting 552), to yield quantized mixing parameters. The quantized mixing parameters may then be entropy encoded (using e.g. Huffman codes). The entropy encoding may encode the quantized mixing parameters of a frame (without considering preceding frames), frequency differences of the quantized mixing parameters or temporal differences of the quantized mixing parameters. The encoding of temporal differences may not be used in case of so called independent frames, which are encoded independently from preceding frames.

Hence, the parameter encoding unit 520 may make use of a combination of differential coding and Huffman coding for the determination of the encoded spatial parameters 562. As outlined above, the encoded spatial parameters 562 may be included as metadata (also referred to as spatial metadata) along with the encoded downmix signal 563 in the bitstream 564. Differential coding and Huffman coding may be used for the transmission of the spatial metadata in order to reduce redundancy and thus increase spare bit-rate available for encoding the downmix signal 563. Since Huffman codes are variable length codes, the size of the spatial metadata can vary largely depending on the statistics of the encoded spatial parameters 562 to be transmitted. The data-rate needed to transmit the spatial metadata deducts from the data-rate available to the core codec (e.g. Dolby Digital Plus) to encode the stereo downmix signal. In order not to compromise the audio quality of the downmix signal, the number of bytes that may be spent for the transmission of the spatial metadata per frame is typically limited. The limit may be subject to encoder tuning considerations, wherein the encoder tuning considerations may be taken into account by the configuration unit 540. However, due to the variable length characteristic of the underlying differential/Huffman coding of the spatial parameters, it cannot typically be guaranteed without any further means that the upper data-rate limit (reflected e.g. in the metadata data-rate setting 552) will not be exceeded.

In the present document, a method for post-processing of the encoded spatial parameters 562 and/or of the spatial metadata comprising the encoded spatial parameters 562 is described. The method 600 for post-processing of the spatial metadata is described in the context of FIG. 6. The method 600 may be applied, when it is determined that the total size of one frame of spatial metadata exceeds the predefined limit indicated e.g. by the metadata data-rate setting 552. The method 600 is directed at reducing the amount of metadata step by step. The reduction of the size of the spatial metadata typically also reduces the precision of the spatial metadata and thus compromises the quality of the spatial image of the reproduced audio signal. However, the method 600 typically guarantees that the total amount of spatial metadata does not exceed the predefined limit and thus allows determining an improved trade-off between spatial metadata (for re-generating the m-channel multi-channel signal) and audio codec metadata (for decoding the encoded downmix signal 563) in terms of overall audio quality. Furthermore, the method 600 for post-processing of the spatial metadata can be implemented at relatively low computational complexity (compared to a complete recalculation of the encoded spatial parameters with modified control settings 552).

The method 600 for post-processing of the spatial metadata may comprise one or more of the following steps. As outlined above, a spatial metadata frame may comprise a plurality of (e.g. one or two) parameter sets per frame, where the use of additional parameter sets allows increasing the temporal resolution of the mixing parameters. The use of a plurality of parameter sets per frame can improve audio quality, especially in case of attack-rich (i.e. transient) signals. Even in case of audio signals with a rather slowly changing spatial image, a spatial parameter update with a twice as dense grid of sampling points may improve audio quality. However, the transmission of a plurality of parameter sets per frame leads to an increase of the data-rate by approximately a factor of two. Thus, if it is determined that the data-rate for the spatial metadata exceeds the metadata data-rate setting 552 (step 601), it may be checked whether the spatial metadata frame comprises more than one set of mixing parameters. In particular, it may be checked if the metadata frame comprises two sets of mixing parameters, which are supposed to be transmitted (step 602). If it is determined that the spatial metadata comprises a plurality of sets of mixing parameters, one or more of the sets exceeding a single set of mixing parameters may be discarded (step 603). As a result of this, the data-rate for the spatial metadata can be significantly reduced (typically by a factor of two, in the case of two sets of mixing parameter), whilst compromising the audio quality only to a relatively low degree.

The decision which one of the two (or more) sets of mixing parameters to drop may depend on whether or not the encoding system 500 has detected transient positions ("attack") in the part of the input signal 561 covered by the current frame: If there are multiple transients present in the current frame, the earlier transients are typically more important than the later transients, because of the psychoacoustic post-masking effect of every single attack. Thus, if transients are present, it may be advisable to discard the later (e.g. the second of two) sets of mixing parameters. On the other hand, in case of absence of attacks, the earlier (e.g. the first of two) sets of mixing parameters may be discarded. This may be due to the windowing which is used when calculating the spatial parameters (as illustrated in FIG. 5*e*). The window 586 which is used to window out the part of the input signal 561, which is used for calculating the spatial parameters for the second set of mixing parameters, typically has its largest impact at the point in time at which the upmix stage 130 places the sampling point for the parameter reconstruction (i.e. at the end of a current frame). On the other hand, the first set of mixing parameters typically has got an offset of half a frame to this point in time. Consequently, the error which is made by dropping the first set of mixing parameters is most likely lower than the error which is made by dropping the second set of mixing. This is shown in FIG. 5*e*, where it can be seen that the second half of the spectra 589 of a current frame 585 used to determine a second set of mixing parameters is influenced to a higher degree by the samples of the current frame 585 than the first half of the spectra 589 of the current frame 585 (for which the window function 586 has lower values than for the second half of the spectra 589).

The spatial cues (i.e. the mixing parameters) calculated in the encoding system 500 are transmitted to the corresponding decoder 100 via a bitstream 562 (which may be part of the bitstream 564 in which the encoded stereo downmix signal 563 is conveyed). Between the calculation of the spatial cues and their representation in the bitstream 562, the encoding unit 524 typically applies a two-step coding approach: The first step, quantization, is a lossy step, since it adds an error to the spatial cues; the second one, the differential/Huffman coding is a lossless step. As outlined above, the encoder 500 can select between different types of quantization (e.g. two types of quantization): a high-resolution quantization scheme which adds relatively little error but results in a larger number of potential quantization indices, thus requiring larger Huffman code words; and a low-resolution quantization scheme which adds relatively more error but results in a lower number of quantization indices, thus requiring not so large Huffman code words. It should be noted that the different types of quantization may be applicable to some or all mixing parameters. By way of example, the different types of quantization may be applicable to the mixing parameters $\alpha_1$, $\alpha_2$, $\alpha_3$, $\beta_1$, $\beta_2$, $\beta_3$, $k_1$. On the other hand, the gain g may be quantized with a fixed type of quantization.

The method 600 may comprise the step 604 of verifying which type of quantization has been used to quantize the spatial parameters. If it is determined that a relatively fine quantization resolution has been used, the encoding unit 524 may be configured to reduce 605 the quantization resolution to a lower type of quantization. As a result, the spatial parameters are quantized once more. This does not, however, add a significant computational overhead (compared to a re-determination of the spatial parameters using different control settings 552). It should be noted that a different type of quantization may be used for the different spatial parameters $\alpha_1$, $\alpha_2$, $\alpha_3$, $\beta_1$, $\beta_2$, $\beta_3$, g, $k_1$. Hence, the encoding unit 524 may be configured to select the quantizer resolution individually for each type of spatial parameter, thereby adjusting the data-rate of the spatial metadata.

The method 600 may comprise the step (not shown in FIG. 6) of reducing the frequency resolution of the spatial parameters. As outlined above, a set of mixing parameters of a frame is typically clustered into frequency bands or parameter bands 572. Each parameter band represents a certain frequency range, and for each band a separate set of spatial cues is determined. Depending on the data-rate available to transmit the spatial metadata, the number of parameter bands 572 may be varied in steps (e.g. 7, 9, 12, or 15 bands). The number of parameter bands 572 approximately stands in linear relation to the data-rate, and thus a reduction of the frequency resolution may significantly reduce the data-rate of the spatial metadata, while only moderately affecting the audio quality. However, such a reduction of the frequency resolution typically requires a recalculation of a set of mixing parameters, using the altered frequency resolution, and thus would increase the computational complexity.

As outlined above, the encoding unit 524 may make use of differential encoding of the (quantized) spatial parameters. The configuration unit 551 may be configured to impose the direct encoding of the spatial parameters of a frame of the input audio signal 561, in order to ensure that transmission errors do not propagate over an unlimited number of frames, and in order to allow a decoder to synchronize to the received bitstream 562 at intermediate time instances. As such, a certain fraction of frames may not make use of differential encoding along the time line. Such frames which do not make use of differential encoding may be referred to as independent frames. The method 600 may comprise the step 606 of verifying whether the current frame is an independent frame and/or whether the independent frame is a forced independent frame. The encoding of the spatial parameters may depend on the result of step 606.

As outlined above, differential coding is typically designed such that differences are calculated either between temporal successors or between neighboring frequency bands of the quantized spatial cues. In both cases, the statistics of the spatial cues are such that small differences occur more often than large differences, and thus small differences are represented by shorter Huffman code words compared to large differences. In the present document, it is proposed to perform a smoothing of the quantized spatial parameters (either over time or over frequency). Smoothing the spatial parameters either over time or over frequency typically results in smaller differences and thus in a reduction of data-rate. Due to psychoacoustic considerations, temporal smoothing is usually preferred over smoothing in the frequency direction. If it is determined that the current frame is not a forced independent frame, the method 600 may proceed in performing temporal differential encoding (step 607), possibly in combination with smoothing over time. On the other hand, the method 600 may proceed in performing frequency differential encoding (step 608) and possibly smoothing along the frequency, if the current frame is determined to be an independent frame.

The differential encoding in steps 607 may be submitted to a smoothing process over time, in order to reduce the data-rate. The degree of smoothing may vary depending on the amount by which the data-rate is to be reduced. The most severe kind of temporal "smoothing" corresponds to holding the unaltered previous set of mixing parameters, which corresponds to transmitting only delta values equal to zero. The temporal smoothing of the differential encoding may be performed for one or more (e.g. for all) of the spatial parameters.

In a similar manner to temporal smoothing, smoothing over frequency may be performed. In its most extreme form, smoothing over frequency corresponds to transmitting the same quantized spatial parameters for the complete frequency range of the input signal 561. While guaranteeing that the limit set by the metadata data-rate setting is not exceeded, smoothing over frequency may have a relatively high impact on the quality of the spatial image that can be reproduced using the spatial metadata. It may therefore be preferable to apply smoothing over frequency only in case that temporal smoothing is not allowed (e.g. if the current frame is a forced independent frame for which time-differential coding with respect to the previous frame must not be used).

As outlined above, the system 500 may be operated subject to one or more external settings 551, such as the overall target data-rate of the bitstream 564 or a sampling rate of the input audio signal 561. There is typically not a single optimum operation point for all combinations of external settings. The configuration unit 540 may be configured to map a valid combination of external settings 551 to a combination of the control settings 552, 554. By way of example, the configuration unit 540 may rely on the results of psychoacoustic listening tests. In particular, the configuration unit 540 may be configured to determine a combination of control settings 552, 554 which ensures (in average) optimum psychoacoustic coding results for a particular combination of external settings 551.

As outlined above, a decoding system 100 shall be able to synchronize to the received bitstream 564 within a given period of time. In order to ensure this, the encoding system 500 may encode so called independent frames, i.e. frames which do not depend on knowledge about their predecessors, on a regular basis. The average distance in frames between two independent frames may be given by the ratio between the given maximum time lag for synchronization and the duration of one frame. This ratio does not necessarily have to be an integer number, wherein the distance between two independent frames is always an integer number of frames.

The encoding system 500 (e.g. the configuration unit 540) may be configured to receive a maximum time lag for synchronization or a desired update time period as an external setting 551. Furthermore, the encoding system 500 (e.g. the configuration unit 540) may comprise a timer module which is configured to keep track of the absolute amount of time that has passed since the first encoded frame of the bitstream 564. The first encoded frame of the bitstream 564 is by definition an independent frame. The encoding system 500 (e.g. the configuration unit 540) may be configured to determine whether a next-to-be encoded frame comprises a sample which corresponds to a time instant which is an integer multiple of the desired update period. Whenever the next-to-be-encoded frame comprises a sample at a point in time which is an integer multiple of the desired update period, the encoding system 500 (e.g. the configuration unit 540) may be configured to ensure that the next-to-be-encoded frame is encoded as an independent frame. By doing this, it can be ensured that the desired update time period is maintained, even though the ratio of the desired update time period and the frame length is not an integer number.

As outlined above, the parameter determination unit 523 is configured to calculate spatial cues based on a time/frequency representation of the multi-channel input signal 561. A frame of spatial metadata may be determined based on the K/Q (e.g. 24) spectra 589 (e.g. QMF spectra) of a current frame and/or based on the K/Q (e.g. 24) spectra 589 (e.g. QMF spectra) of a look-ahead frame, wherein each spectrum 589 may have a frequency resolution of Q (e.g. 64) frequency bins 571. Depending on whether or not the encoding system 500 detects transients in the input signal 561, the temporal length of the signal portion which is used for calculating a single set of spatial cues may comprise a different number of spectra 589 (e.g. 1 spectrum to up to 2 times K/Q spectra). As shown in FIG. 5*c*, each spectrum 589 is divided into a certain number of frequency bands 572 (e.g. 7, 9, 12, or 15 frequency bands) which—due to psychoacoustic considerations—comprise a different number of frequency bins 571 (e.g. 1 frequency bin to up to 41 frequency). The different frequency bands p 572 and the different temporal segments [q, v] define a grid on the time/frequency representation of the current frame and the look-ahead frame of the input signal 561. For the different "boxes" in this grid, a different set of spatial cues may be calculated based upon estimates of the energy and/or covariance of at least some of the input channels within the different "boxes", respectively. As outlined above, the energy estimates and/or covariance may be calculated by summing up the squares of the transform coefficients 580 of one channel and/or by summing up the products of transform coefficients 580 of different channels, respectively (as indicated by the formulas provided above). The different transform coefficients 580 may be weighted in accordance to a window function 586 used for determining the spatial parameters.

The calculation of the energy estimates $E_{1,1}(p)$, $E_{2,2}(p)$ and/or covariance $E_{1,2}(p)$ may be carried out in fixed point arithmetic. In this case, the different size of the "boxes" of the time/frequency grid may have an impact on the arithmetic precision of the values determined for the spatial parameters. As outlined above, the number of frequency bins (j−i+1) 571 per frequency band 572 and/or the length of the time interval [q, v] of a "box" of the time/frequency grid may vary significantly (e.g. between 1×1×2 and 48×41×2 transform coefficients 580 (e.g. real parts and complex parts of a complex QMF coefficients)). By consequence, the number of products $\mathrm{Re}\{a_{t,f}\}\mathrm{Re}\{b_{t,f}\}$ and $\mathrm{Im}\{a_{t,f}\}\mathrm{Im}\{b_{t,f}\}$ which need to summed up for determining the energies $E_{1,1}(p)$/covariance $E_{1,2}(p)$ may vary significantly. In order to prevent the result of the calculation from exceeding the range of numbers that can be represented in fixed point arithmetic, the signals may be scaled down by a maximum number of bits (e.g. by 6 bits due to $2^6 \cdot 2^6 = 4096 \geq 48 \cdot 41 \cdot 2$). However, this approach results in a significant reduction of arithmetic precision for smaller "boxes" and/or for "boxes" comprising only relatively low signal energy.

In the present document, it is proposed to use an individual scaling per "box" of the time/frequency grid. The individual scaling may depend on the number of transform coefficients 580 comprised within the "box" of the time/frequency grid. Typically, a spatial parameter for a particular "box" of the time frequency grid (i.e. for a particular frequency band 572 and for a particular temporal interval [q,v]) is determined only based on the transform coefficients 580 from the particular "box" (and does not depend on transform coefficients 580 from other "boxes"). Furthermore, a spatial parameter is typically only determined based on energy estimate and/or covariance ratios (and is typically not affected by absolute energy estimates and/or covariance). In other words, a single spatial cue typically does not use but energy estimates and/or cross-channel products from one single time/frequency "box". Furthermore, the spatial cues are typically not affected by absolute energy estimates/covariance but only by energy estimate/covariance ratios. Therefore, it is possible to use an individual scaling in every single "box". This scaling should be matched for the channels which are contributing to a particular spatial cue.

The energy estimates $E_{1,1}(p)$, $E_{2,2}(p)$ of a first and second channel 561-1, 561-2 and the covariance $E_{1,2}(p)$ between the first and second channels 561-1, 561-2, for the frequency band p 572 and for the time interval [q,v] may be determined e.g. as indicated by the formulas above. The energy estimates and the covariance may be scaled by a scaling factor $s_p$, to provide the scaled energies and covariance: $s_p \cdot E_{1,1}(p)$, $s_p \cdot E_{2,2}(p)$ and $s_p \cdot E_{1,2}(p)$. The spatial parameter P(p) which is derived based on the energy estimates $E_{1,1}(p)$, $E_{2,2}(p)$ and the covariance $E_{1,2}(p)$ typically depends on the ratio of the energies and/or of the covariance, such that the value of the spatial parameter P(p) is independent of the scaling factor $s_p$. By consequence, different scaling factors $s_p$, $s_{p+1}$, $s_{p+2}$ may be used for different frequency bands p, p+1, p+2.

It should be noted that one or more of the spatial parameters may depend on more than two different input channels (e.g. three different channels). In this case, the one or more spatial parameters may be derived based on energy estimates $E_{1,1}(p)$, $E_{2,2}(p)$, . . . of the different channels, as well as based on respective covariances between different pairs of the channels, i.e. $E_{1,2}(p)$, $E_{1,3}(p)$, $E_{2,3}(p)$, etc. Also in this case, the value of the one or more spatial parameters is independent of a scaling factor applied to the energy estimates and/or covariances.

In particular, the scaling factor $s_p = 2^{-z_p}$ for a particular frequency band p, wherein $z_p$ is a positive integer indicating a shift in the fixed point arithmetic, may be determined such that $$0.5 < s_p \cdot \max\{|E_{1,1}(p)|, |E_{2,2}(p)|, |E_{1,2}(p)|\} \leq 1.0$$

and such that the shift $z_p$ is minimal. By ensuring this individually for each frequency band p and/or for each temporal interval [q,v] for which mixing parameters are determined, an increased (e.g. maximum) precision in fixed point arithmetic may be achieved, while ensuring a valid value range.

By way of example, an individual scaling can be implemented by checking for every single MAC (multiply-accumulate) operation whether the result of the MAC operation could exceed +/−1. Only if this is the case, the individual scaling for the "box" may be increased by one bit. Once this has been done for all channels, the largest scaling for each "box" may be determined, and all the deviating scaling of the "box" may be adapted accordingly.

As outlined above, the spatial metadata may comprise one or more (e.g. two) sets of spatial parameters per frame. As such, the encoding system 500 may transmit one or more sets of spatial parameters per frame to a corresponding decoding system 100. Each one of the sets of spatial parameters corresponds to one particular spectrum out of the K/Q temporally subsequent spectra 289 of a frame of spatial metadata. This particular spectrum corresponds to a particular time instant, and the particular time instant may be referred to as a sampling point. FIG. 5c shows two example sampling points 583, 584 of two sets of spatial parameters, respectively. The sampling points 583, 584 may be associated with particular events comprised within the input audio signal 561. Alternatively, the sampling points may be predetermined.

The sampling points 583, 584 are indicative of the time instant at which the corresponding spatial parameters should be fully applied by the decoding system 100. In other words, the decoding system 100 may be configured to update the spatial parameters according to the transmitted sets of spatial parameters at the sampling points 583, 584. Furthermore, the decoding system 100 may be configured to interpolate the spatial parameters in between two subsequent sampling points. The spatial metadata may be indicative of a type of transition which is to be performed between succeeding sets of spatial parameters. Examples for types of transitions are a "smooth" and a "steep" transition between the spatial parameters, meaning that the spatial parameters may be interpolated in a smooth (e.g. linear) manner or may be updated abruptly, respectively.

In case of "smooth" transitions, the sampling points may be fixed (i.e. pre-determined) and thus do not need to be signaled in the bitstream 564. If the frame of spatial metadata conveys a single set of spatial parameters, the predetermined sampling point may be the position at the very end of the frame, i.e. the sampling point may correspond to the $(K/Q)^{th}$ spectrum 589. If the frame of spatial metadata conveys two sets of spatial parameters, the first sampling point may correspond to the $(K/2Q)^{th}$ spectrum 589, the second sampling point may correspond to the $(K/Q)^{th}$ spectrum 589.

In case of "steep" transitions, the sampling points 583, 584 may be variable and may be signaled in the bitstream 562. The portion of the bitstream 562 which carries the information about the number of sets of spatial parameters used in one frame, the information about the selection between "smooth" and "steep" transitions, and the information about the positions of the sampling points in case of "steep" transitions may be referred to as the "framing" portion of the bitstream 562. FIG. 7*a* shows example transition schemes which may be applied by a decoding system 100 depending on the framing information comprised within the received bitstream 562.

By way of example, the framing information for a particular frame may indicate a "smooth" transition and a single set 711 of spatial parameters. In this case, the decoding system 100 (e.g. the first mixing matrix 130) may assume the sampling point for the set 711 of spatial parameters to correspond to the last spectrum of the particular frame. Furthermore, the decoding system 100 may be configured to interpolate (e.g. linearly) 701 between the last received set 710 of spatial parameters for the directly preceding frame and the set 711 of spatial parameters for the particular frame. In another example, the framing information for the particular frame may indicate a "smooth" transition and two sets 711, 712 of spatial parameters. In this case, the decoding system 100 (e.g. the first mixing matrix 130) may assume the sampling point for the first set 711 of spatial parameters to correspond to the last spectrum of the first half of the particular frame, and the sampling point for the second set 712 of spatial parameters to correspond to the last spectrum of the second half of the particular frame. Furthermore, the decoding system 100 may be configured to interpolate (e.g. linearly) 702 between the last received set 710 of spatial parameters for the directly preceding frame and the first set 711 of spatial parameters and between the first set 711 of spatial parameters and the second set 712 of spatial parameters.

In a further example, the framing information for a particular frame may indicate a "steep" transition, a single set 711 of spatial parameters and a sampling point 583 for the single set 711 of spatial parameters. In this case, the decoding system 100 (e.g. the first mixing matrix 130) may be configured to apply the last received set 710 of spatial parameters for the directly preceding frame until the sampling point 583 and to apply the set 711 of spatial parameters starting from the sampling point 583 (as shown by the curve 703). In another example, the framing information for a particular frame may indicate a "steep" transition, two sets 711, 712 of spatial parameters and two corresponding sampling points 583, 584 for the two sets 711, 712 of spatial parameters, respectively. In this case, the decoding system 100 (e.g. the first mixing matrix 130) may be configured to apply the last received set 710 of spatial parameters for the directly preceding frame until the first sampling point 583, and to apply the first set 711 of spatial parameters starting from the first sampling point 583 up to the second sampling point 584, and to apply the second set 712 of spatial parameters starting from the second sampling point 584 at least until to the end of the particular frame (as shown by the curve 704).

The encoding system 500 should ensure that the framing information matches the signal characteristics, and that the appropriate portions of the input signal 561 are chosen to calculate the one or more sets 711, 712 of spatial parameters. For this purpose, the encoding system 500 may comprise a detector which is configured to detect signal positions at which the signal energy in one or more channels increases abruptly. If at least one such signal position is found, the encoding system 500 may be configured to switch from "smooth" transitioning to "steep" transitioning, otherwise the encoding system 500 may continue with "smooth" transitioning.

As outlined above, the encoding system 500 (e.g. the parameter determination unit 523) may be configured to calculate the spatial parameters for a current frame based on a plurality of frames 585, 590 of the input audio signal 561 (e.g. based on the current frame 585 and based on the directly subsequent frame 590, i.e. the so called look-ahead frame). As such, the parameter determination unit 523 may be configured to determine the spatial parameters based on two times K/Q spectra 589 (as illustrated in FIG. 5*e*). The spectra 589 may be windowed by a window 586 as shown in FIG. 5*e*. In the present document, it is proposed to adapt the window 586 based on the number of sets 711, 712 of spatial parameters which are to be determined, based on the type of transitioning and/or based on the position of the sampling points 583, 584. By doing this, it can be ensured that the framing information matches the signal characteristics, and that the appropriate portions of the input signal 561 are selected to calculate the one or more sets 711, 712 of spatial parameters.

In the following, example window functions for different encoder/signal situations are described:

a) Situation: a single set 711 of spatial parameters, smooth transitioning, no transient in the look-ahead frame 590;
window function 586: Between the last spectrum of the preceding frame and the $(K/Q)^{th}$ spectrum 589, the window function 586 may rise linearly from 0 to 1. Between the $(K/Q)^{th}$ and the $48^{th}$ spectrum 589, the window function 586 may fall linearly from 1 to 0 (see FIG. 5*e*).

b) Situation: a single set 711 of spatial parameters, smooth transitioning, a transient in the $N^{th}$ spectrum (N>K/Q), i.e. a transient in the look-ahead frame 590;
window function 721 as shown in FIG. 7*b*: Between the last spectrum of the preceding frame and the $(K/Q)^{th}$ spectrum, the window function 721 rises linearly from 0 to 1. Between the $(K/Q)^{th}$ and the $(N-1)^{st}$ spectrum, the window function 721 remains constant at 1. Between the $N^{th}$ and the $(2*K/Q)^{th}$ spectrum, the window function remains constant at 0. The transient at the $N^{th}$ spectrum is represented by the transient point 724 (which corresponds to the sampling point for a set of spatial parameters of the directly following frame 590). Furthermore, the complementary window function 722 (which is applied to the spectra of the current frame 585, when determining the one or more sets of spatial parameters for the preceding frame) and the window function 723 (which is applied to the spectra of the following frame 590, when determining the one or more sets of spatial parameters for the following frame) are shown in FIG. 7*b*. Overall, the window function 721 ensures that in case of one or more transients in the look-ahead frame 590, the spectra of the look-ahead frame preceding the first transient point 724 are fully taken into account for determining the set 711 of spatial parameters for the current frame 585. On the other hand, the spectra of the look-ahead frame 590 which follow the transient point 724 are ignored.

c) Situation: a single set 711 of spatial parameters, steep transitioning, a transient in the $N^{th}$ spectrum (N<=K/Q), and no transient in the subsequent frame 590;
Window function 731 as shown in FIG. 7*c*: Between the $1^{st}$ and the $(N-1)^{st}$ spectrum, the window function 731 remains constant at 0. Between the $N^{th}$ and the $(K/Q)^{th}$ spectrum, the window function 731 remains constant at 1. Between the $(K/Q)^{th}$ and the $(2*K/Q)^{th}$ spectrum, the window function 731 falls linearly from 1 to 0. FIG. 7*c* indicates the transient point 734 at the $N^{th}$ spectrum (which corresponds to the sampling point for the single set 711 of spatial parameters). Furthermore, FIG. 7*c* shows the window function 732 which is applied to the spectra of the current frame 585, when determining the one or more sets of spatial parameters for the preceding frame, and the window function 733 which is applied to the spectra of the following frame 590, when determining the one or more sets of spatial parameters for the following frame.

d) Situation: a single set of spatial parameters, steep transitioning, transients in the $N^{th}$ and $M^{th}$ spectra (N<=K/Q, M>K/Q);

Window function 741 in FIG. 7*d*: Between the $1^{st}$ and the $(N-1)^{st}$ spectrum, the window function 741 remains constant at 0. Between the $N^{th}$ and the $(M-1)^{st}$ spectrum, the window function 741 remains constant at 1. Between the $M^{th}$ and the $48^{th}$ spectrum, the window function remains constant 0. FIG. 7*d* indicates the transient point 744 at the $N^{th}$ spectrum (i.e. the sampling point of the set of spatial parameters) and the transient point 745 at the $M^{th}$ spectrum. Furthermore, FIG. 7*d* shows the window function 742 which is applied to the spectra of the current frame 585, when determining the one or more sets of spatial parameters for the preceding frame, and the window function 743 which is applied to the spectra of the following frame 590, when determining the one or more sets of spatial parameters for the following frame.

e) Situation: two sets of spatial parameters, smooth transitioning, no transient in subsequent frame;

Window functions:

i.) $1^{st}$ set of spatial parameters: Between the last spectrum of the preceding frame and the $(K/2Q)^{th}$ spectrum, the window rises linearly from 0 to 1. Between the $(K/2Q)^{th}$ and the $(K/Q)^{th}$ spectrum, the window falls linearly from 1 to 0. Between the $(K/Q)^{th}$ and the $(2*K/Q)^{th}$ spectrum, the window remains constant at 0.

ii.) $2^{nd}$ set of spatial parameters: Between the $1^{st}$ and the $(K/2Q)^{th}$ spectrum, the window remains constant at 0. Between the $(K/2Q)^{th}$ and the $(K/Q)^{th}$ spectrum, the window rises linearly from 0 to 1. Between the $(K/Q)^{th}$ and the $(3*K/2Q)^{th}$ spectrum, the window falls linearly from 1 to 0. Between the $(3*K/2Q)^{th}$ and the $(2*K/Q)^{th}$ spectrum, the window remains constant at 0.

f) Situation: two sets of spatial parameters, smooth transitioning, transient in the $N^{th}$ spectrum (N>K/Q);

Window functions:

i.) $1^{st}$ set of spatial parameters: Between the last spectrum of the preceding frame and the $(K/2Q)^{th}$ spectrum, the window rises linearly from 0 to 1. Between the $(K/2Q)^{th}$ and the $(K/Q)^{th}$ spectrum, the window falls linearly from 1 to 0. Between the $(K/Q)^{th}$ and the $(2*K/Q)^{th}$ spectrum, the window remains constant at 0.

ii.) $2^{nd}$ set of spatial parameters: Between the $1^{st}$ and the $(K/2Q)^{th}$ spectrum, the window remains constant at 0. Between the $(K/2Q)^{th}$ and the $(K/Q)^{th}$ spectrum, the window rises linearly from 0 to 1. Between the $(K/Q)^{th}$ and the $(N-1)^{st}$ spectrum, the window remains constant at 1. Between the $N^{th}$ and the $(2*K/Q)^{th}$ spectrum, the window remains constant at 0.

g) Situation: two sets of parameters, steep transitioning, transients in the $N^{th}$ and $M^{th}$ spectra (N<M<=K/Q), no transients in subsequent frame;

Window functions:

i.) $1^{st}$ set of spatial parameters: Between the $1^{st}$ and the $(N-1)^{st}$ spectrum, the window remains constant at 0. Between the $N^{th}$ and the $(M-1)^{st}$ spectrum, the window remains constant at 1. Between the $M^{th}$ and the $(2*K/Q)^{th}$ spectrum, the window remains constant at 0.

ii.) $2^{nd}$ set of spatial parameters: Between the $1^{st}$ and the $(M-1)^{st}$ spectrum, the window remains constant at 0. Between the $M^{th}$ and the $(K/Q)^{th}$ spectrum, the window remains constant at 1. Between the $(K/Q)^{th}$ and the $(2*K/Q)^{th}$ spectrum, the window falls linearly from 1 to 0.

h) Situation: two sets of spatial parameters, steep transitioning, transients in $N^{th}$, $M^{th}$ and $O^{th}$ spectra (N<M<=K/Q, O>K/Q);

Window functions:

i.) $1^{st}$ set of spatial parameters: Between the $1^{st}$ and the $(N-1)^{st}$ spectrum, the window remains constant at 0. Between the $N^{th}$ and the $(M-1)^{st}$ spectrum, the window remains constant at 1. Between the $M^{th}$ and the $(2*K/Q)^{th}$ spectrum, the window remains constant 0.

ii.) $2^{nd}$ set of spatial parameters: Between the $1^{st}$ and the $(M-1)^{st}$ spectrum, the window remains constant 0. Between the $M^{th}$ and the $(O-1)^{st}$ spectrum, the window remains constant at 1. Between the $O^{th}$ and the $(2*K/Q)^{th}$ spectrum, the window remains constant at 0.

Overall, the following example rules for the window function for determining a current set of spatial parameters may be stipulated:

if the current set of spatial parameters is not associated with a transient, the window function provides for a smooth phase-in of the spectra from the sampling point of the preceding set of spatial parameters up to the sampling point of the current set of spatial parameters;

the window function provides for a smooth phase-out of the spectra from the sampling point of the current set of spatial parameters up to the sampling point of the following set of spatial parameters, if the following set of spatial parameters in not associated with a transient;

the window function considers fully the spectra from the sampling point of the current set of spatial parameters up to the spectrum preceding the sampling point of the following set of spatial parameters and cancels out the spectra starting from the sampling point of the following set of spatial parameters, if the following set of spatial parameters is associated with a transient;

if the current set of spatial parameters is associated with a transient, the window function cancels out the spectra preceding the sampling point of the current set of spatial parameters;

the window function considers fully the spectra from the sampling point of the current set of spatial parameters up to the spectrum preceding the sampling point of the following set of spatial parameters and cancels out the spectra starting from the sampling point of the following set of spatial parameters, if the sampling point of the following set of spatial parameters is associated with a transient;

the window function considers fully the spectra from the sampling point of the current set of spatial parameters up to the spectrum at the end of the current frame and provides for a smooth phase-out of the spectra from the beginning of the look-ahead frame up to the sampling point of the following set of spatial parameters, if the following set of spatial parameters in not associated with a transient.

In the following, a method for reducing the delay in a parametric multi-channel codec system comprising an encoding system 500 and a decoding system 100 is described. As outlined above, the encoding system 500 comprises several processing paths, such as downmix signal generation and encoding, and parameter determination and encoding. The decoding system 100 typically performs a decoding of the encoded downmix signal and the generation of a decorrelated downmix signal. Furthermore, the decoding system 100 performs a decoding of the encoded spatial metadata. Subsequently, the decoded spatial metadata is applied to the decoded downmix signal and to the decorrelated downmix signal, to generate the upmix signal in the first upmix matrix 130.

It is desirable to provide an encoding system 500 which is configured to provide a bitstream 564 which enables the decoding system 100 to generate the upmix signal Y, with reduced delay and/or with reduced buffer memory. As outlined above, the encoding system 500 comprises several different paths that may be aligned so that the encoded data provided to the decoding system 100 within the bitstream 564 matches up correctly at decoding time. As outlined above, the encoding system 500 performs downmixing and encoding of the PCM signal 561. Furthermore, the encoding system 500 determines the spatial metadata from the PCM signal 561.

In addition, the encoding system 500 may be configured to determine one or more clip gains (typically one clip gain per frame). The clip gains are indicative of clipping prevention gains that have been applied to the downmix signal X in order to ensure that the downmix signal X does not clip. The one or more clip gains may be transmitted within the bitstream 564 (typically within the spatial metadata frame), in order to enable the decoding system 100 to re-generate the upmix signal Y. In addition, the encoding system 500 may be configured to determine one or more Dynamic Range Control (DRC) values (e.g. one or more DRC values per frame). The one or more DRC values may be used by a decoding system 100 to perform Dynamic Range Control of the upmixed signal Y. In particular, the one or more DRC values may ensure that the DRC performance of the parametric multi-channel codec system described in the present document is similar to (or equal to) the DRC performance of legacy multi-channel codec systems such as Dolby Digital Plus. The one or more DRC values may be transmitted within the downmix audio frame (e.g. within an appropriate field of the Dolby Digital Plus bitstream).

As such, the encoding system 500 may comprise at least four signal processing paths. In order to align these four paths, the encoding system 500 may also take into account the delays that are introduced into the system by different processing components which are not directly related to the encoding system 500, such as the core encoder delay, the core decoder delay, the spatial metadata decoder delay, the LFE filter delay (for filtering an LFE channel) and/or the QMF analysis delay.

In order to align the different paths, the delay of the DRC processing path may be considered. The DRC processing delay can typically only be aligned to frames and not on a time sample by sample basis. As such, the DRC processing delay is typically only dependent on the core encoder delay which may be rounded up to the next frame alignment, i.e. DRC processing delay=round up (core encoder delay/frame size). Based on this, the downmix processing delay for generating the downmix signal may be determined, as the downmix processing delay can be delayed on a time sample basis, i.e. downmix processing delay=DRC delay*frame size−core encoder delay. The remaining delays can be calculated by summing up individual delay lines and by ensuring that the delay matches up at the decoder stage, as shown in FIG. 8.

By considering the different processing delays when writing the bitstream 564, the processing power (number of input channels−1*1536 less copy operations) as well as the memory at the decoding system 100 can be reduced, when delaying the resulting spatial metadata (number of input channels*1536*4 Byte−245 Bytes less memory) by one frame instead of delaying the encoded PCM data by 1536 samples. As a result of the delay, all signal paths are aligned exactly by the time sample and are not only matching up roughly.

As outlined above, FIG. 8 illustrates the different delays incurred by an example encoding system 500. The numbers in the brackets of FIG. 8 indicate example delays in number of samples of the input signal 561. The encoding system 500 typically comprises a delay 801 caused by filtering the LFE channel of the multi-channel input signal 561. Furthermore, a delay 802 (referred to as "clipgainpcmdelayline") may be caused by determining the clip-gain (i.e. the DRC2 parameter described below), which is to be applied to the input signal 561, in order to prevent the downmix signal from clipping. In particular, this delay 802 may be introduced to synchronize the clip-gain application in the encoding system 500 to the application of the clip-gain in the decoding system 100. For this purpose, the input to the downmix calculation (performed by the downmix processing unit 510) may be delayed by an amount which is equal to the delay 811 of the decoder 140 of the downmix signal (referred to as the "coredecdelay"). This means that in the illustrated example clipgainpcmdelayline=coredecdelay=288 samples.

The downmix processing unit 510 (comprising e.g. the Dolby Digital Plus encoder) delays the processing path of the audio data, i.e. of the downmix signal, but the downmix processing unit 510 does not delay the processing path of the spatial metadata and the processing path for the DRC/clip-gain data. Consequently, the downmix processing unit 510 should delay calculated DRC gains, clip-gains and spatial metadata. For the DRC gains this delay typically needs to be a multiple of one frame. The delay 807 of the DRC delay line (referred to as "drcdelayline") may be calculated as drcdelayline=ceil((corencdelay+clipgainpcmdelayline)/frame_size)=2 frames; wherein "coreencdelay" refers to the delay 810 of the encoder of the downmix signal.

The delay of the DRC gains can typically only be a multiple of the frame size. Due to this, an additional delay may need to be added in the downmix processing path, in order to compensate for this and round up to the next multiple of the frame size. The additional downmix delay 806 (referred to as "dmxdelayline") may be determined by dmxdelayline+coreencdelay+ clipgainpcmdelayline=drcdelayline*frame_size; and dmxdelayline=drcdelayline*frame_size−coreencdelay−clipgainpcmdelayline, such that dmxdelayline=100.

The spatial parameters should be in sync with the downmix signal when the spatial parameters are applied in the frequency domain (e.g. in the QMF domain) on the decoder-side. To compensate for the fact that the encoder of the downmix signal does not delay the spatial metadata frame, but delays the downmix processing path, the input to the parameter extractor 420 should be delayed, such that the following condition applies: dmxdelayline+coreencdelay+coredecdelay+aspdecanadelay=aspdelayline+qmfanadelay+framingdelay. In the above formula, “qmfanadelay” specifies the delay 804 caused by the transform unit 521 and “framingdelay” specifies the delay 805 caused by the windowing of the transform coefficients 580 and the determination of the spatial parameters. As outlined above, the framing calculation makes use of two frames as input, the current frame and a look-ahead frame. Due to the look-ahead, the framing introduces a delay 805 of exactly one frame length. Furthermore, the delay 804 is known, such that the additional delay which is to be applied to the processing path for determining the spatial metadata is aspdelayline=dmxdelayline+coreencdelay+coredecdelay+aspdecanadelay−qmfanadelay−framingdelay=1856. Since this delay is bigger than one frame, the memory size of the delayline can be reduced by delaying the calculated bitstream instead of delaying the input PCM data, thereby providing an aspbsdelayline=floor (aspdelayline/frame_size)=1 frame (delay 809) and an asppcmdelayline=aspdelayline−aspbsdelayline*frame_size=320 (delay 803).

After the calculation of the one or more clip-gains, the one or more clip-gains are provided to the bitstream generation unit 530. Hence, the one or more clip-gains experience the delay which is applied on the final bitstream by the aspbsdelayline 809. As such, the additional delay 808 for the clip-gain should be: clipgainbsdelayline+aspbsdelayline=dmxdelayline+coreencdelay+coredecdelay, which provides: clipgainbsdelayline=dmxdelayline+coreencdelay+coredecdelay−aspbsdelayline=1 frame. In other words, it should be ensured that the one or more clip-gains are provided to the decoding system 500 directly subsequent to the decoding of the corresponding frame of the downmix signal, such that the one or more clip-gains can be applied to the downmix signal prior to performing the upmix in the upmix stage 130.

FIG. 8 shows further delays incurred at the decoding system 100, such as the delay 812 caused by the time-domain to frequency-domain transforms 301, 302 of the decoding system 100 (referred to as “aspdecanadelay”), the delay 813 caused by the frequency-domain to time-domain transforms 311 to 316 (referred to as “aspdecsyndelay”) and further delays 814.

As can be seen from FIG. 8, the different processing paths of the codec system comprise processing related delays or alignment delays, which ensure that the different output data from the different processing paths is available at the decoding system 100, when needed. The alignment delays (e.g. the delays 803, 809, 807, 808, 806) are provided within the encoding system 500, thereby reducing the processing power and memory required at the decoding system 100. The total delays for the different processing paths (excluding the LFE filter delay 801 which is applicable to all processing paths) are as follows:

- downmix processing path: sum of the delays 802, 806, 810=3072, i.e. two frames;
- DRC processing path: delay 807=3072, i.e. two frames;
- clip-gain processing path: sum of delays 808, 809, 802=3360, which corresponds to the delay of the downmix processing path in addition to the delay 811 of the decoder of the downmix signal;
- spatial metadata processing path: sum of the delays 802, 803, 804, 805, 809=4000, which corresponds to the delay of the downmix processing path in addition to the delay 811 of the decoder of the downmix signal and in addition to the delay 812 caused by the time-domain to frequency-domain transform stages 301, 302;

Hence, it is ensured that the DRC data is available at the decoding system 100 at time instant 821, that the clip-gain data is available at time instant 822 and that the spatial metadata is available at time instant 823.

Furthermore, it can be seen from FIG. 8 that the bitstream generation unit 530 may combine encoded audio data and spatial metadata which may relate to different excerpts of the input audio signal 561. In particular, it can be seen that the downmix processing path, the DRC processing path and the clip-gain processing path have a delay of exactly two frames (3072 samples) up to the output of the encoding system 500 (indicated by the interfaces 831, 832, 833) (when ignoring the delay 801). The encoded downmix signal is provided by interface 831, the DRC gain data is provided by interface 832 and the spatial metadata and the clip-gain data is provided by interface 833. Typically, the encoded downmix signal and the DRC gain data are provided in a conventional Dolby Digital Plus frame, and the clip-gain data and the spatial metadata may be provided in the spatial metadata frame (e.g. in the auxiliary field of the Dolby Digital Plus frame).

It can be seen that the spatial metadata processing path at interface 833 has a delay of 4000 samples (when ignoring the delay 801), which is different from the delay of the other processing paths (3072 samples). This means that a spatial metadata frame may relate to a different excerpt of the input signal 561 than a frame of the downmix signal. In particular, it can be seen that in order to ensure an alignment at the decoding system 100, the bitstream generation unit 530 should be configured to generate a bitstream 564 which comprises a sequence of bitstream frames, wherein a bitstream frame is indicative of a frame of the downmix signal corresponding to a first frame of the multi-channel input signal 561 and a spatial metadata frame corresponding to a second frame of the multi-channel input signal 561. The first frame and the second frame of the multi-channel input signal 561 may comprise the same number of samples. Nevertheless, the first frame and the second frame of the multi-channel input signal 561 may be different from one another. In particular, the first and second frames may correspond to different excerpts of the multi-channel input signal 561. Even more particularly, the first frame may comprise samples which precede the samples of the second frame. By way of example, the first frame may comprise samples of the multi-channel input signal 561 which precede the samples of the second frame of the multi-channel input signal 561 by a pre-determined number of samples, e.g. 928 samples.

As outlined above, the encoding system 500 may be configured to determine dynamic range control (DRC) and/or clip-gain data. In particular, the encoding system 500 may be configured to ensure that the downmix signal X does not clip. Furthermore, the encoding system 500 may be configured to provide a dynamic range control (DRC) parameter which ensures that the DRC behavior of the multi-channel signal Y, which is encoded using the above mentioned parametric encoding scheme is similar or equal to the DRC behavior of the multi-channel signal Y, which is encoded using a reference multi-channel encoding system (such as Dolby Digital Plus).

FIG. 9*a* shows a block-diagram of an example dual-mode encoding system 900. It should be noted that the portions 930, 931 of the dual-mode encoding system 900 are typically provided separately. The n-channel input signal Y 561 is provided to each of an upper portion 930, which is active at least in a multi-channel coding mode of the encoding system 900, and a lower portion 931, which is active at least in a parametric coding mode of the system 900. The lower portion 931 of the encoding system 900 may correspond to or may comprise e.g. the encoding system 500. The upper portion 930 may correspond to a reference multi-channel encoder (such as a Dolby Digital Plus encoder). The upper portion 930 generally comprises a discrete-mode DRC analyzer 910 arranged in parallel with an encoder 911, both of which receive the audio signal Y 561 as input. Based on this input signal 561, the encoder 911 outputs an encoded n-channel signal $\hat{Y}$, whereas the DRC analyzer 910 outputs one or more post-processing DRC parameters DRC1 quantifying a decoder-side DRC to be applied. The DRC parameters DRC1 may be "compr" gain (compressor gain) and/or dynrng" gain (dynamic range gain) parameters. The parallel outputs from both units 910, 911 are gathered by a discrete-mode multiplexer 912, which outputs a bitstream P. The bitstream P may have a pre-determined syntax, e.g. a Dolby Digital Plus syntax.

The lower portion 931 of the encoding system 900 comprises a parametric analysis stage 922 arranged in parallel with a parametric-mode DRC analyzer 921 receiving, as the parametric analysis stage 922, the n-channel input signal Y. The parametric analysis stage 922 may comprise the parameter extractor 420. Based on the n-channel audio signal Y, the parametric analysis stage 922 outputs one or more mixing parameters (as outlined above), collectively denoted by $\alpha$ in FIGS. 9*a* and 9*b*, and an m-channel ($1<m<n$) downmix signal X, which is next processed by a core signal encoder 923 (e.g. a Dolby Digital Plus encoder), which outputs, based thereon, an encoded downmix signal $\hat{X}$. The parametric analysis stage 922 affects a dynamic range limiting in time blocks or frames of the input signal where this may be required. A possible condition controlling when to apply dynamic range limiting may be a 'non-clip condition' or an 'in-range condition', implying, in time block or frame segments where the downmix signal has high amplitude, that the signal is processed so that it fits within the defined range. The condition may be enforced on the basis of one time block or one time frame comprising several time blocks. By way of example, a frame of the input signal 561 may comprise a pre-determined number (e.g. 6) blocks. Preferably, the condition is enforced by applying a broad-spectrum gain reduction rather than truncating only peak values or using similar approaches.

FIG. 9*b* shows a possible implementation of the parametric analysis stage 922, which comprises a pre-processor 927 and a parametric analysis processor 928. The pre-processor 927 is responsible for performing the dynamic range limiting on the n-channel input signal 561, whereby it outputs a dynamic range limited n-channel signal, which is supplied to the parametric analysis processor 928. The pre-processor 527 further outputs a block- or frame-wise value of the pre-processing DRC parameters DRC2. Together with mixing parameters $\alpha$ and the m-channel downmix signal X from the parametric analysis processor 928, the parameters DRC2 are included in the output from the parametric analysis stage 922.

The parameter DRC2 may also be referred to as the clip-gain. The parameter DRC2 may be indicative of the gain which has been applied to the multi-channel input signal 561, in order to ensure that the downmix signal X does not clip. The one or more channels of the downmix signal X may be determined from the channels of the input signal Y by determining linear combinations of some or all of the channels of the input signal Y. By way of example, the input signal Y may be a 5.1 multi-channel signal and the downmix signal may be a stereo signal. The samples of the left and right channels of the downmix signal may be generated based on different linear combinations of the samples of the 5.1 multi-channel input signal.

The DRC2 parameters may be determined such that the maximum amplitude of the channels of the downmix signal does not exceed a pre-determined threshold value. This may be ensured on a block-by-block basis or on a frame-by-frame basis. A single gain (the clip-gain) per block or frame may be applied to the channels of the multi-channel input signal Y in order to ensure that the above mentioned condition is met. The DRC2 parameter may be indicative of this gain (e.g. of the inverse of the gain).

With reference to FIG. 9*a*, it is noted that the discrete-mode DRC analyzer 910 functions similarly to the parametric-mode DRC analyzer 921 in that it outputs one or more post-processing DRC parameters DRC1 quantifying a decoder-side DRC to be applied. As such, the parametric-mode DRC analyzer 921 may be configured to simulate the DRC processing performed by the reference multi-channel encoder 930. The parameters DRC1 provided by the parametric-mode DRC analyzer 921 are typically not included in the bitstream P in the parametric coding mode, but instead undergo compensation so that the dynamic range limiting carried out by the parametric analysis stage 922 is accounted for. For this purpose, a DRC up-compensator 924 receives the post-processing DRC parameters DRC1 and the pre-processing DRC parameters DRC2. For each block or frame, the DRC up-compensator 924 derives a value of one or more compensated post-processing DRC parameters DRC3, which are such that the combined action of the compensated post-processing DRC parameters DRC3 and the pre-processing DRC parameters DRC2 is quantitatively equivalent to the DRC quantified by the post-processing DRC parameters DRC1. Put differently, the DRC up-compensator 924 is configured to reduce the post-processing DRC parameters output by the DRC analyzer 921 by that share of it (if any) which has already been effected by the parametric analysis stage 922. It is the compensated post-processing DRC parameters DRC3 that may be included in the bitstream P.

Referring to the lower portion 931 of the system 900, a parametric-mode multiplexer 925 collects the compensated post-processing DRC parameters DRC3, the pre-processing DRC parameters DRC2, the mixing parameters $\alpha$ and the encoded downmix signal X, and forms, based thereon, the bitstream P. As such, the parametric-mode multiplexer 925 may comprise or may correspond to the bitstream generation unit 530. In a possible implementation, the compensated post-processing DRC parameters DRC3 and the pre-processing DRC parameters DRC2 may be encoded in logarithmic form as dB values influencing an amplitude upscaling or downscaling on the decoder side. The compensated post-processing DRC parameters DRC3 may have any sign. However, the pre-processing DRC parameters DRC2, which result from enforcement of a 'non-clip condition' or the like, will typically be represented by a non-negative dB value at all times.

FIG. 10 shows example processing which may e.g. be performed in the parametric-mode DRC analyzer 921 and in the DRC up-compensator 924 in order to determine modified DRC parameters DRC3 (e.g. modified "dynrng gain" and/or "compr gain" parameters).

The DRC2 and DRC3 parameters may be used to ensure that the decoding system 100 plays back different audio bitstreams at a consistent loudness level. Furthermore, it may be ensured that the bitstreams generated by a parametric encoding system 500 have consistent loudness levels with respect to bitstreams generated by legacy and/or reference encoding systems (such as Dolby Digital Plus). As outlined above, this may be ensured by generating a downmix signal at the encoding system 500 which does not clip (using the DRC2 parameters) and by providing the DRC2 parameters (e.g. the inverse of the attenuation which has been applied for preventing clipping of the downmix signal) within the bitstream, in order to enable the decoding system 100 to recreate the original loudness (when generating an upmix signal).

As outlined above, the downmix signal is typically generated based on a linear combination of some or all of the channels of the multi-channel input signal 561. As such, the scaling factor (or attenuation) which is applied to the channels of the multi-channel input signal 561 may depend on all the channels of the multi-channel input signal 561, which have contributed to the downmix signal. In particular, the one or more channels of the downmix signals may be determined based on the LFE channel of the multi-channel input signal 561. By consequence, the scaling factor (or attenuation) which is applied for clipping protection should also take into account the LFE channel. This is different from other multi-channel encoding systems (such as Dolby Digital Plus), where the LFE channel is typically not taken into account for clipping protection. By taking into account the LFE channel and/or all channels which have contributed to the downmix signal, the quality of clipping protection may be improved.

As such, the one or more DRC2 parameters which are provided to the corresponding decoding system 100 may depend on all the channels of the input signal 561 which have contributed to the downmix signal, in particular, the DRC2 parameters may depend on the LFE channel. By doing so, the quality of clipping protection may be improved.

It should be note that the dialnorm parameter may not be taken into account for the calculation of the scaling factor and/or the DRC2 parameter (as illustrated in FIG. 10).

As outlined above, the encoding system 500 may be configured to write so called "clip-gains" (i.e. DRC2 parameters) into the spatial metadata frame which indicate which gains have been applied upon the input signal 561, in order to prevent clipping in the downmix signal. The corresponding decoding system 100 may be configured to exactly invert the clip-gains applied in the encoding system 500. However, only sampling points of the clip-gains are transmitted in the bitstream. In other words, the clip-gain parameters are typically determined only on a per-frame or on a per-block basis. The decoding system 100 may be configured to interpolate the clip-gain values (i.e. the received DRC2 parameters) in between the sampling points between neighboring sampling points.

An example interpolation curve for interpolating DRC2 parameters for adjacent frames is illustrated in FIG. 11. In particular, FIG. 11 shows a first DRC2 parameter 953 for a first frame and a second DRC2 parameter 954 for a following second frame 950. The decoding system 100 may be configured to interpolate between the first DRC2 parameter 953 and the second DRC2 parameter 954. The interpolation may be performed within a subset 951 of samples of the second frame 950, e.g. within a first block 951 of the second frame 950 (as shown by the interpolation curve 952). The interpolation of the DRC2 parameter ensures a smooth transition between adjacent audio frames, and thereby avoids audible artifacts which may be caused by differences between subsequent DRC2 parameters 953, 954.

The encoding system 500 (in particular the downmix processing unit 510) may be configured to apply the corresponding clip-gain interpolation to the DRC2 interpolation 952 performed by the decoding system 500, when generating the downmix signal. This ensures that the clip-gain protection of the downmix signal is consistently removed when generating an upmix signal. In other words, the encoding system 500 may be configured to simulate the curve of DRC2 values resulting from the DRC2 interpolation 952 applied by the decoding system 100. Furthermore, the encoding system 500 may be configured to apply the exact (i.e. sample-by-sample) inverse of this curve of DRC2 values to the multi-channel input signal 561, when generating the downmix signal.

The methods and systems described in the present document may be implemented as software, firmware and/or hardware. Certain components may e.g. be implemented as software running on a digital signal processor or microprocessor. Other components may e.g. be implemented as hardware and or as application specific integrated circuits. The signals encountered in the described methods and systems may be stored on media such as random access memory or optical storage media. They may be transferred via networks, such as radio networks, satellite networks, wireless networks or wireline networks, e.g. the Internet. Typical devices making use of the methods and systems described in the present document are portable electronic devices or other consumer equipment which are used to store and/or render audio signals.

The invention claimed is:

1. A method comprising:

receiving, by an audio processor, a multi-channel input audio signal;

determining a first set of dynamic range control (DRC) values configured for controlling a dynamic range of an output audio signal, wherein the first set of DRC values is represented in logarithmic form as dB values;

determining a second set of DRC values configured for preventing the multi-channel input audio signal from clipping during downmixing by the audio processor;

applying the second set of DRC values to the multi-channel input audio signal to obtain an attenuated multi-channel input audio signal;

downmixing the attenuated multi-channel input audio signal to obtain a downmix signal; and generating the output audio signal from the first set of DRC values and the downmix audio signal.

2. An apparatus comprising:

one or more processors;

memory storing instructions, which, when executed by the one or more processors, causes the one or more processors to perform operations comprising:

receiving a multi-channel input audio signal;

determining a first set of dynamic range control (DRC) values configured for controlling a dynamic range of an output audio signal, wherein the first set of DRC values is represented in logarithmic form as dB values;

determining a second set of DRC values configured for preventing the multi-channel input audio signal from clipping during downmixing by the apparatus;

applying the second set of DRC values to the multi-channel input audio signal to obtain an attenuated multi-channel input audio signal;

downmixing the attenuated multi-channel input audio signal to obtain a downmix signal; and generating the output audio signal from the first set of DRC values and the downmix audio signal.

3. A non-transitory computer readable storage medium comprising a sequence of instructions which, when performed by an audio signal processing device cause the audio signal processing device to perform a method comprising:

receiving, by an audio processor, a multi-channel input audio signal;

determining a first set of dynamic range control (DRC) values configured for controlling a dynamic range of an output audio signal, wherein the first set of DRC values is represented in logarithmic form as dB values;

determining a second set of DRC values configured for preventing the multi-channel input audio signal from clipping during downmixing by the audio processor;

applying the second set of DRC values to the multi-channel input audio signal to obtain an attenuated multi-channel input audio signal;

downmixing the attenuated multi-channel input audio signal to obtain a downmix signal; and generating the output audio signal from the first set of DRC values and the downmix audio signal.

* * * * *